US011756175B2

(12) United States Patent
Adams

(10) Patent No.: US 11,756,175 B2
(45) Date of Patent: Sep. 12, 2023

(54) FAST MEDIAN FILTERS UTILIZING SEPARABLE SORTING NETWORKS

(71) Applicant: Adobe Inc., San Jose, CA (US)

(72) Inventor: Andrew Adams, Mountain View, CA (US)

(73) Assignee: Adobe Inc., San Jose, CA (US)

( * ) Notice: Subject to any disclaimer, the term of this patent is extended or adjusted under 35 U.S.C. 154(b) by 253 days.

(21) Appl. No.: 17/306,018

(22) Filed: May 3, 2021

(65) Prior Publication Data

US 2022/0366550 A1 Nov. 17, 2022

(51) Int. Cl.
| | |
|---|---|
| *G06T 5/20* | (2006.01) |
| *G06T 11/40* | (2006.01) |
| *G06T 5/50* | (2006.01) |
| *G06T 11/60* | (2006.01) |

(52) U.S. Cl.
CPC ............ *G06T 5/20* (2013.01); *G06T 5/50* (2013.01); *G06T 11/40* (2013.01); *G06T 11/60* (2013.01); *G06T 2207/20221* (2013.01)

(58) Field of Classification Search
CPC ... G06T 5/20; G06T 5/50; G06T 11/40; G06T 11/60; G06T 2207/20221; G06T 2207/20032; G06T 5/002
See application file for complete search history.

(56) References Cited

U.S. PATENT DOCUMENTS

| | | | |
|---|---|---|---|
| 4,724,395 A | 2/1988 | Freeman | |
| 6,754,684 B1* | 6/2004 | Kotlov | G06T 5/20 |
| | | | 708/304 |
| 9,031,349 B1* | 5/2015 | Ma | G06T 5/20 |
| | | | 382/262 |
| 2006/0110063 A1* | 5/2006 | Weiss | G06T 5/002 |
| | | | 382/168 |
| 2018/0005353 A1* | 1/2018 | Kounavis | G06T 5/40 |

OTHER PUBLICATIONS

Kenneth E Batcher. 1968. Sorting networks and their applications. In Proceedings of the Apr. 30-May 2, 1968, spring joint computer conference. 307-314.

(Continued)

*Primary Examiner* — Vu Le
*Assistant Examiner* — Anderson M Speed
(74) *Attorney, Agent, or Firm* — Keller Preece PLLC

(57) ABSTRACT

The present disclosure relates to systems, methods, and non-transitory computer readable media for efficiently, quickly, and flexibly applying median filters to digital image utilizing a separable sorting network approach for computation sharing. For example, the disclosed systems generate a modified digital image by determining pixel values for a number of output tiles in applying a median filter. To generate output tiles, in some implementations, the disclosed systems utilize different forms of separability to precompute sorted columns of pixels to reduce the size of per-pixel tasks required to generate output pixels and to share computations among nearby pixels of an input tile captured from a digital image in generating output tiles. In some implementations, the disclosed systems utilize an interpreter to generate and apply a median filter to a digital image at runtime based on a user-selected filter size.

20 Claims, 16 Drawing Sheets

(56) References Cited

OTHER PUBLICATIONS

G. Bradski. 2000. The OpenCV Library. Dr. Dobb's Journal of Software Tools (2000).
Michael Codish and Moshe Zazon-Ivry. 2010. Pairwise cardinality networks. In Inter—national Conference on Logic for Programming Artificial Intelligence and Reasoning. Springer, 154-172.
Derry Fitzgerald. 2010. Harmonic/percussive separation using median filtering. In Proceedings of the International Conference on Digital Audio Effects (DAFx), vol. 13.
Oded Green. 2017. Efficient scalable median filtering using histogram-based operations. IEEE Transactions on Image Processing 27, 5 (2017), 2217-2228.
Wenzel Jakob. 2019. Enoki: structured vectorization and differentiation on modern processor architectures, https://github.com/mitsuba-renderer/enoki.
Michał Karpiński and Marek Piotrów. 2019. Encoding cardinality constraints using multiway merge selection networks. Constraints 24, 3-4 (2019), 234-251.
Michael Kass and Justin Solomon. 2010. Smoothed local histogram filters. In ACM SIGGRAPH 2010 papers. 1-10. Part 1.
Michael Kass and Justin Solomon. 2010. Smoothed local histogram filters. In ACM SIGGRAPH 2010 papers. 1-10. Part 2.
Michael Kass and Justin Solomon. 2010. Smoothed local histogram filters. In ACM SIGGRAPH 2010 papers. 1-10. Part 3.
Michael Kass and Justin Solomon. 2010. Smoothed local histogram filters. In ACM SIGGRAPH 2010 papers. 1-10.Part 4.
Minsik Kim, Deokho Kim, Minyong Sung, and Won Woo Ro. 2015. An accelerated separable median filter with sorting networks. In 2015 IEEE International Conference on Image Processing (ICIP). IEEE, 803-807.
Morgan McGuire. 2008. A Fast, Small-Radius GPU Median Filter. In Published in ShaderX6. https://casual- effects.com/research/McGuire2008Median/index.html ShaderX6.
NVIDIA. 2020. NVIDIA Performance Primitives. https://developer.nvidia.com/NPP.
Ian Parberry. 1992. The pairwise sorting network. Parallel Processing Letters 2, 02n03 (1992), 205-211.
Grégoire Pau, Florian Fuchs, Oleg Sklyar, Michael Boutros, and Wolfgang Huber. 2010. EBImage—an R package for image processing with applications to cellular phenotypes. Bioinformatics 26, 7 (Mar. 2010), 979-981. https://doi.org/10. 1093/bioinformatics/btq046 arXiv:https://academic.oup.com/bioinformatics/article-pdf/26/7/979/559050/btq046.pdf.
Simon Perreault and Patrick Hébert. 2007. Median filtering in constant time. IEEE transactions on image processing 16, 9 (2007), 2389-2394.
Gilles Perrot, Stéphane Domas, and Raphaël Couturier. 2014. Fine-tuned High-speed Implementation of a GPU-based Median Filter. Journal of Signal Processing Systems 75, 3 (2014), 185-190.
Fatih Porikli. 2005. Integral histogram: A fast way to extract histograms in cartesian spaces. In 2005 IEEE Computer Society Conference on Computer Vision and Pattern Recognition (CVPR'05), vol. 1. IEEE, 829-836.
Jonathan Ragan-Kelley, Andrew Adams, Sylvain Paris, Marc Levoy, Saman Amarasinghe, and Frédo Durand. 2012. Decoupling algorithms from schedules for easy optimization of image processing pipelines. ACM Transactions on Graphics (TOG) 31, 4 (2012), 1-12.
Gabriel Salvador, Juan M Chau, Jorge Quesada, and Cesar Carranza. 2018. Efficient GPU-based implementation of the median filter based on a multi-pixel-per-thread framework. In 2018 IEEE Southwest Symposium on Image Analysis and Interpretation (SSIAI). IEEE, 121-124.
Ricardo M Sánchez and Paul A Rodríguez. 2013. Highly parallelable bidimensional median filter for modern parallel programming models. Journal of Signal Processing Systems 71, 3 (2013), 221-235.
E. Stewart. 2004. Intel Integrated Performance Primitives: Howto Optimize Software Applications Using Intel IPP. Intel Press.
Deqing Sun, Stefan Roth, and Michael J Black. 2010. Secrets of optical flow estimation and their principles. In 2010 IEEE computer society conference on computer vision and pattern recognition. IEEE, 2432-2439.
Vaibhav Vavilala. 2019. Light pruning on Toy Story 4. In ACM SIGGRAPH 2019 Talks. 1-2.
Frederick M Waltz. 1989. Fast implementation of ranked filters on general-purpose image processing hardware. In Automated Inspection and High-Speed Vision Archi- tectures II, vol. 1004. International Society for Optics and Photonics, 25-32.
Frederick M Waltz, Ralf Hack, and Bruce G Batchelor. 1998. Fast efficient algorithms for 3×3 ranked filters using finite-state machines. In Machine Vision Systems for In-spection and Metrology VII, vol. 3521. International Society for Optics and Photonics, 278-287.
Ben Weiss. 2006. Fast median and bilateral filtering. In ACM SIGGRAPH 2006 Papers. 519-526.
Pavan Yalamanchili, Umar Arshad, Zakiuddin Mohammed, Pradeep Garigipati, Peter Entschev, Brian Kloppenborg, James Malcolm, and John Melonakos. 2015. ArrayFire—A high performance software library for parallel computing with an easy-to-use API. https://github.com/arrayfire/arrayfire.
Qingxiong Yang, Narendra Ahuja, and Kar-Han Tan. 2015. Constant time median and bilateral filtering. International Journal of Computer Vision 112, 3 (2015), 307-318.
Jure Žbontar and Yann LeCun. 2016. Stereo matching by training a convolutional neural network to compare image patches. The journal of machine learning research 17, 1 (2016), 2287-2318.
Sorav Bansal and Alex Aiken. 2006. Automatic generation of peephole superoptimizers. ACM SIGARCH Computer Architecture News 34, 5 (2006), 394-403.
Donald E. Knuth. 1998. The Art of Computer Programming (3rd ed.). Fundamental Algorithms, vol. 1. Addison Wesley Longman Publishing Co., Inc. (book). Part 1.
Donald E. Knuth. 1998. The Art of Computer Programming (3rd ed.). Fundamental Algorithms, vol. 1. Addison Wesley Longman Publishing Co., Inc. (book). Part 2.
Donald E. Knuth. 1998. The Art of Computer Programming (3rd ed.). Fundamental Algorithms, vol. 1. Addison Wesley Longman Publishing Co., Inc. (book). Part 3.
Donald E. Knuth. 1998. The Art of Computer Programming (3rd ed.). Fundamental Algorithms, vol. 1. Addison Wesley Longman Publishing Co., Inc. (book). Part 4.
Ian Parberry. 1990. Single-exception sorting networks and the computational complexity of optimal sorting network verification. Mathematical systems theory 23, 1 (1990), 81-93.
Li, J. S. J., "Nonlinear smoothing filters and their realization", PhDT, 1989. A thesis submitted to the University of New South Wales.

* cited by examiner

FAST MEDIAN FILTERS UTILIZING SEPARABLE SORTING NETWORKS

BACKGROUND

Median filters are a widely used tool in graphics, imaging, machine learning visual effects, and even audio processing. For example, median filters are popular in digital image processing for denoising, skin smoothing, and removing unwanted image artifacts. Over the years, engineers have developed different types of median filters, such as median filters that are based on conventional sorting networks as well as median filters that are based on histograms. Despite these advances, however, many conventional median filter systems continue to demonstrate a number of deficiencies or drawbacks, particularly in speed, efficiency, and flexibility.

As suggested, many conventional median filter systems are slow in filtering digital images. A median filter generally replaces each pixel in a digital image with the median of a surrounding neighborhood of a given size. A straightforward (e.g., brute force calculation) approach to applying a median filter is quite slow, especially when the filter size is large. While some conventional systems exist for computing median filters more quickly, these systems can only handle filters of a few specific sizes. For example, some conventional systems utilize sorting networks for small filter sizes, while other conventional systems utilize histogram-based methods for arbitrary filter sizes, though neither approach provides a fast solution for median filters of various sizes. Indeed, conventional sorting-network-based systems are not extensible to large filter sizes, and the histogram-based systems scale poorly as well (and are often infeasible, especially for higher precision data types such as floating points).

As an additional drawback of conventional median filter systems, some conventional systems are also inefficient. Indeed, many conventional sorting-network-based systems require compiling a separate piece of for each different size of a median filter. Because these conventional systems largely operate using a few specific filter sizes, this compiling issue was not overly burdensome for these systems in their specific applications. However, the requirement to compile separate code for each filter size renders these conventional sorting network systems infeasible, or at least impractical, for generating filters of arbitrary sizes. If applied to generate arbitrarily sized median filters, these conventional systems would require excessively large numbers of memory operations (e.g., load operations and store operations) to store and access pixel values in memory registers. Indeed, conventional systems are often optimized for reducing the number of swap operations performed when applying a median filter, which results in a trade-off for an increase in more computationally expensive memory operations of accessing and storing values in registers. Performing large numbers of memory operations requires excessive computing resources, such as processing power and memory. In some cases, the computational burden of performing large numbers of memory operations further slows down the generation and/or application of median filters, especially as the filter size increases. As a result, many conventional systems are too slow for time sensitive scenarios such as on-the-fly filter generation (e.g., in real time with user interaction to apply a median filter).

Beyond the foregoing inefficiencies, many conventional median filter systems are also inflexible. In particular, as suggested above, conventional systems that are based on histograms are nearly impossible to adapt to increasingly standard floating point formats. In attempts to address this problem, some engineers have attempted to adapt conventional sorting-network-based median filters to floating point formats, but these conventional sorting network systems nevertheless cannot readily scale with changes in filter size. Specifically, conventional systems cannot adapt efficient sorting networks for changes in filter size. Indeed, optimal networks are generally known for small filter sizes, but even a 5×5 median filter is well outside of this regime, and conventional systems thus cannot identify and/or apply efficient networks at larger sizes (and sometimes use inefficient networks even at smaller sizes).

Further contributing to the inflexibility of conventional systems, the size of their conventional sorting networks grows super-linearly with the size of the filter, which results in slow operation, especially with large filter sizes. Additionally, to apply a sorting network, conventional systems compile a separate piece of code for each different filter size, and the size (and the corresponding compile time) of the code increases with the size of the filter, thus rendering many conventional systems incapable of utilizing large median filters. Due to their inflexibility to accommodate varying filter sizes, conventional systems cannot flexibly adapt median filters to time sensitive scenarios such as generating median filters on the fly in response to user interaction.

Thus, there are several disadvantages with regard to conventional median filter systems.

SUMMARY

This disclosure describes one or more implementations of systems, methods, and non-transitory computer readable media that solve one or more of the foregoing or other problems in the art with a separable sorting network approach for applying median filters to digital images. In some cases, the disclosed systems generate a modified digital image by determining pixel values for a number of output tiles in applying a median filter. To improve over conventional systems, the disclosed systems factor computation of an arbitrarily sized median filter into a composition of separable sorting networks to share computations among nearby pixels. For example, per scanline of a filtered digital image, the disclosed systems precompute sorted columns of pixels to reduce the size of per-pixel tasks required to generate output pixels. In addition, in some cases, the disclosed systems generate filtered digital images by computing output pixels in small tiles that grow with the filter size. To generate output tiles, in some implementations, the disclosed systems perform the majority of the filtering computations over intersections of output pixel footprints (e.g., portions of an input tile that map to respective output pixels) shared by all output pixels, fewer computations over intersections of output pixel footprints shared by only a subset of the output pixels, and the fewest computations for pixels of an input tile unique to a single output pixel. In one or more implementations, the disclosed systems utilize an interpreter to generate and apply a median filter to a digital image at runtime (e.g., in response to user input to generate and/or apply the median filter) based on a user-selected (or otherwise determined) filter size.

Additional features and advantages of one or more implementations of the present disclosure are outlined in the description which follows, and in part will be obvious from the description, or may be learned by the practice of such example implementations.

BRIEF DESCRIPTION OF THE DRAWINGS

This disclosure describes one or more implementations of the invention with additional specificity and detail by referencing the accompanying figures. The following paragraphs briefly describe those figures, in which.

DETAILED DESCRIPTION

Figure 1:
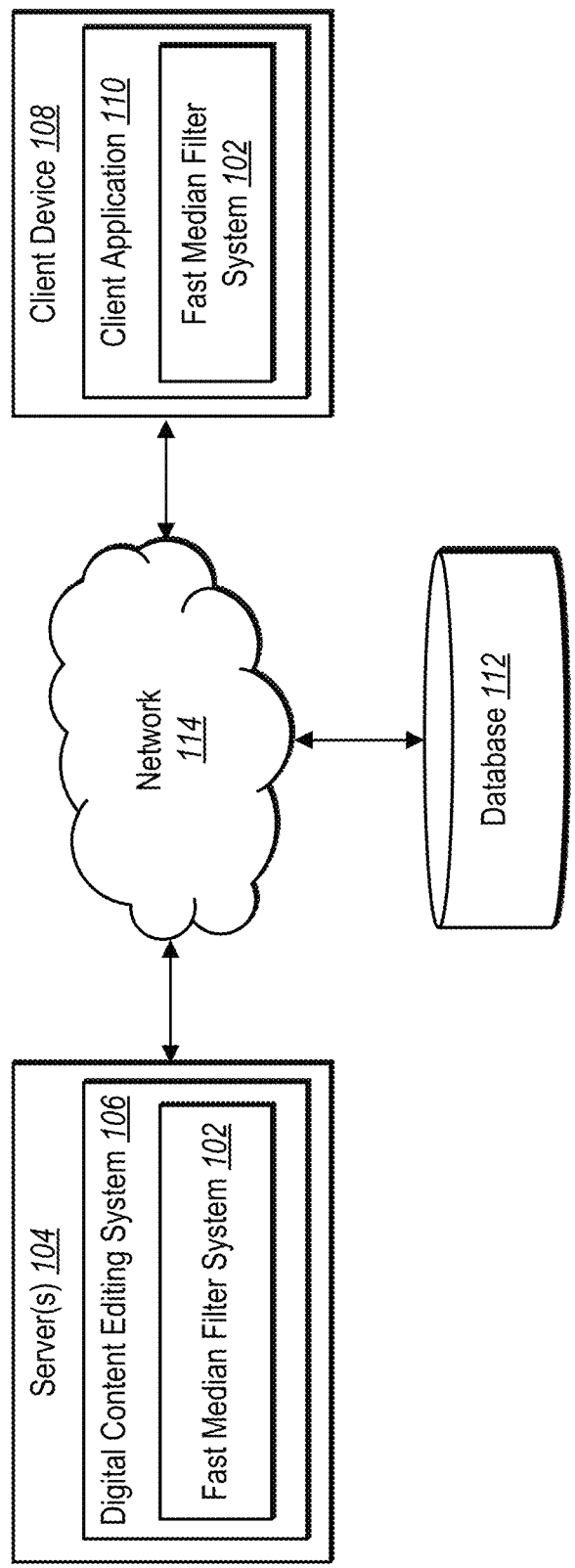
FIG. 1 illustrates an example system environment in which a fast median filter system operates in accordance with one or more implementations.

This disclosure describes one or more implementations of a fast median filter system that efficiently, quickly, and flexibly generates filtered digital images utilizing a separable sorting network approach for applying median filters to digital images. In particular, in some implementations, the fast median filter system captures an input tile from a digital image utilizing a median filter and determines one or more median pixel values (e.g., one median pixel value for each pixel of an output tile) from the input tile utilizing a specialized computation-sharing method. For example, to generate an output tile from the input tile, the fast median filter system determines pixels of the input tile that map to pixels of the output tile, where a plurality of pixels of the input tile map to a single pixel of the output tile. To share computations among nearby pixels in generating the output tile, in one or more implementations, the fast median filter system groups columns and rows of pixels of the input tile to selectively determine or identify those input pixels that could possibly represent a median pixel value for a given output pixel (while removing the other input pixels from consideration). Using the computation-sharing method, experimenters have demonstrated that the fast median filter system computes median filters many times faster than conventional systems (e.g., 7× faster for a 29×29 median filter applied to a 16 bit image, and up to 100× faster at other filter sizes and bit depths). In some cases, the fast median filter system utilizes an interpreter, as opposed to a compiler, to generate a median filter at runtime based on a user-selected filter size.

As just mentioned, in one or more implementations, the fast median filter system utilizes a specialized computation-sharing method to generate a modified digital image by filtering a digital image utilizing a fast median filter. Particularly, in some cases, the fast median filter system generates a modified digital image that includes a number of output tiles of filtered pixel values determined from an input tile captured by sliding a window of a median filter over an input digital image.

To determine or generate an output tile of the modified digital image, in some implementations, the fast median filter system utilizes a composition of sorting networks and merging networks to selectively sort and merge pixels of an input tile at different stages for generating an output tile. In some implementations, the fast median filter system determines or identifies a core subset of pixels of the input tile. For example, the fast median filter system selects pixels of the input tile that map to pixels of the corresponding output tile to include within the core subset of pixels. Put another way, the fast median filter system identifies as core pixels those input pixels that could possibly represent median pixel values for any of the output pixels. In some cases, the fast median filter system further sorts the core subset of pixels utilizing a sorting network. The fast median filter system further identifies or selects, for each output pixel, a middle number of pixels from the core subset that could potentially include a corresponding median pixel value.

Additionally, in some implementations, the fast median filter system identifies or determines extra columns of pixels from the input tile that are separate from the core subset of pixels. For example, the fast median filter system analyzes the input tile to identify adjacent columns of pixels that are not part of the core subset. In some cases, the fast median filter system further merges or combines the extra columns into groups of extra columns of pixels utilizing a merge network. In these or other implementations, the fast median filter system merges the groups of extra columns with the core subset of pixels to generate column-modified subsets of pixels. In certain cases, the fast median filter system further selects middle numbers (e.g., middlemost numbers) of pixels from the column-modified subsets of pixels as possibly containing median pixel values for corresponding output pixels. For instance, the fast median filter system selects a middle number of pixels from a particular column-modified subset of pixels corresponding to a particular output pixel of an output tile.

In some implementations, the fast median filter system identifies and sorts extra rows of pixels as well. For example, the fast median filter system analyzes the input tile to identify extra rows of pixels that are part of the input tile but that are separate from the core subset of pixels. In some implementations, the fast median filter system utilizes a sorting network to sort the extra rows of pixels. In certain cases, the fast median filter system further utilizes a merge network to merge the extra rows of pixels into groups of extra rows. Additional detail regarding the sorting and merging of pixels (in extra rows and extra columns) is provided below with reference to the figures.

As mentioned above, in one or more implementations, the fast median filter system generates an output tile of median pixel values from the input tile. For example, the fast median filter system determines a median pixel value for each output pixel of an output tile. To determine a median pixel value, in some cases, the fast median filter system performs a multi-step process for each output pixel. For instance, the fast median filter system, for each pixel in the output tile: i) merges a corresponding group of extra rows of pixels (that map to the output pixel) with the respective column-modified subset of pixels (that maps to the output pixel) to generate a row-column-modified subset of pixels, ii) selects a middle subset of pixels (that map to the output pixel) from the column-modified subset of pixels, iii) sorts corner pixels (not included in the extra rows, the extra columns, or the core subset) that map to the output pixel, iv) merges the corner pixels with the middle subset of pixels (to generate a corner-modified subset of pixels), and v) determines a median pixel value from among the corner-modified subset of pixels.

As mentioned, in certain described implementations, the fast median filter system utilizes an interpreter to generate and execute a median filter, as opposed to utilizing a compiler. For example, the fast median filter system utilizes a sorting network interpreter to generate a median filter at runtime (rather than precompiling the median filter before runtime) according to a particular filter size (e.g., as indicated via user interaction). In some cases, the fast median filter system generates a modified median filter by inflating a template median filter by a particular factor according to the filter size. Additionally, in these or other cases, the fast median filter system executes the modified median filter utilizing a sorting network interpreter to perform a limited number of memory operations (per number of swap operations). Thus, the fast median filter system generates a modified, filtered digital image from an input digital image utilizing an interpreter to apply a median filter on the fly (e.g., in real time or near real time with user input selecting a filter size).

As suggested above, the fast median filter system provides one or more advantages over conventional median filter systems. For example, implementations of the fast median filter system improve speed over conventional systems. In particular, implementations of the fast median filter system utilize a separable sorting network approach to share computations among nearby pixels to increase speed for any filter size and any data type (e.g., 16-bit integers and floating points). For instance, implementations of the fast median filter system utilize specific algorithms described herein to group pixels into rows and columns for combining with pixels of an input tile captured by a median filter. As explained in further detail below with reference to the figures, certain implementations of the fast median filter system perform many times faster than conventional systems when applying median filters to digital images. The improvements are more pronounced for larger median filters and larger bit depths of digital images.

Additionally, implementations of the fast median filter system are also able to improve computational efficiency over conventional median filter systems. For example, implementations the of fast median filter system reduce computing resource requirements, especially for larger median filters. Rather than requiring compiling of separate code for each filter size, like some conventional systems, the fast median filter system utilizes a network inflating approach that can be executed more efficiently by an interpreter that operates using fewer memory operations (e.g., via larger operations than single swaps). Indeed, where some conventional systems would require large numbers of memory operations, the fast median filter system requires fewer memory operations and is therefore faster and more efficient (even if more less expensive swap operations are required).

Because the fast median filter system is faster than conventional systems, certain implementations of the fast median filter system are capable of generating median filters on the fly (e.g., contemporaneously in real time with user input). Additionally, and unlike conventional systems, implementations of the fast median filter system utilize an interpreter to generate and apply a median filter, as opposed to a compiler approach used by conventional systems. Indeed, the fast median filter system utilizes an interpreter to, in real time or near real time with user input selecting a filter size, generate and apply a median filter according to the user-selected filter size (a process that would take conventional systems several minutes or more to compile).

Additionally, the fast median filter system is able to provide improved flexibility over conventional median filter systems. For example, implementations of the fast median filter system utilize a separable sorting network approach to share computation among nearby pixels, enabling better adaptation to floating point formats as compared to conventional systems that utilize histogram-based techniques. In addition, whereas conventional sorting-network-based systems cannot readily scale with changes to filter size, the fast median filter system is scalable to adjust for different filter sizes. For instance, compared to conventional systems, implementations of the fast median filter system improve scalability by reducing the size of the component sorting networks themselves and by utilizing specially selected sorting networks for each sorting task (e.g., column sorting versus row sorting or identifying a median pixel value) and applying the computation sharing technique described herein to fuse operations and/or remove operations performed by conventional systems.

Further relating to improved flexibility, the fast median filter system utilizes a computation sharing technique of identifying core pixels, merging groups of extra columns and extra rows of pixels, and identifying middlemost pixels for generating outputs which (in addition to the user of an interpreter) facilitates scalability across different filter sizes. The computation sharing, in addition to the use of a sorting network interpreter, enable the fast median filter system to flexibly adapt to different sizes of median filter (e.g., median filters of an arbitrary size), while many conventional systems are incompatible with large median filters (e.g., larger than 5×5 pixels or 7×7 pixels). Due to the flexibility in accommodating varying filter sizes, the fast median filter system is able to adapt median filters to time sensitive scenarios such as generating median filters on the fly in response to user interaction.

As suggested by the foregoing discussion, this disclosure utilizes a variety of terms to describe features and benefits of the fast median filter system. Additional detail is hereafter provided regarding the meaning of these terms as used in this disclosure. In particular, the term "sorting network" refers to a network or a computer algorithm that sorts or arranges pixels according to their respective pixel values. For example, a sorting network includes an algorithm of a fixed sequence of min instructions (e.g., instructions to compare two or more values and select the lowest value) and max instructions (e.g., instructions to compare two or more values and select the highest value). In some cases, a sorting network refers to a separable sorting network for sorting a list of pixel values (e.g., from lowest to highest pixel values, highest to lowest, or in some other order), for selecting a middle number of pixels from a sorted list, and/or for selecting a median pixel value. In some implementations, a sorting network refers to a pairwise selection network (pruned to the output range of interest) for sorting a list or a diagonal sorting network for selecting middle numbers of pixels and/or median pixel values.

Additionally, the term "merge network" refers to a network or a computer algorithm that merges two or more sorted lists of pixel values. For example, a merge network refers to an algorithm for merging lists pixel values pairwise in a binary tree. As another example, a merge network refers to a sorting network where each swap is interpreted as a directive to merge lists in place. In some implementations, a merge network refers to an odd-even mergesort network for merging two already sorted lists of pixel values.

Relatedly, a "swap operation" (or sometimes simply "swap") refers to an operation to swap or exchange two pixel values. In some cases, a swap operation includes a single min/max instruction pair. For example, a swap operation includes an instruction to compare two pixel values, to determine whether or not the pixel values are out of order (e.g., within a list), and to swap or exchange the order of the pixel values if they are out of order.

In addition, the term "memory operation" refers to a computer operation to access or store information within one or more memory registers of a processor or a computing device. For example, a memory operation includes a load operation to load information (e.g., a pixel value) from a memory register. As another example, a memory operation includes a store operation to store information (e.g., a pixel value) within a memory register.

In some implementations, the fast median filter system identifies and selects a subset of core pixels from an input tile. As used herein, the term "core pixel" refers to a pixel of an input tile that maps to each pixel of an output tile. For example, a core pixel belongs to a particular subset of input pixels (e.g., pixels from an input tile) whose values could possibly be a median pixel value of any of the corresponding output pixels. Relatedly, the term "input tile" refers to a tile or a portion of a digital image captured by a median filter. For example, an input tile includes a square (or some other shape) of pixels having dimensions defined by a window size of a median filter. The fast median filter system identifies median pixel values from an input tile to generate a corresponding output tile of filtered pixel values.

As used herein, the term "output tile" refers to a tile or an arrangement of output pixels. For example, an output tile refers to a portion of a modified or a filtered digital image generated from an input tile captured from an input (e.g., unfiltered) digital image. In some cases, an output tile includes a tile of pixels whose values are median pixel values selected from an input tile based on a filter size. In some implementations, an output pixel of an output tile maps to, corresponds to, or is selected from, a particular number of pixels of an input tile. Thus, in some cases, an output tile is smaller in size than an input tile.

As used herein, the term "footprint" refers to a group or set of pixels that corresponds to a particular output pixel of an output tile. For example, a footprint includes a number of pixels that map to an output pixel, or that possibly include a median pixel value corresponding to the output pixel.

As mentioned above, in some implementations, the fast median filter system generates a column-modified subset of pixels by merging extra columns of pixels with a core subset of pixels. As used herein, the term "column-modified subset" refers to a group of pixels that includes a core subset of pixels of an input tile as well as one or more extra columns of pixels that were initially separate from the core subset of pixels. For example, a column-modified subset of pixels includes a sorted group of extra columns of pixels. In some cases, the group of extra columns included within a given column-modified subset includes only columns of pixels adjacent to each other within the input tile (and that map to a particular output pixel). In certain implementations, a pixel within a given column maps to more than one, but not all, output pixels of an output tile.

Similarly, in some implementations, the fast median filter system generates a row-column-modified subset of pixels by merging extra rows of pixels with middle pixels selected from a column-modified subset. As used herein, the term "row-column-modified subset" refers to a group of pixels that includes a core subset of pixels of an input tile as well as one or more extra rows of pixels that were initially separate from core subset of pixels. For example, a row-column-modified subset includes a sorted group of extra rows of pixels. In some cases, the group of extra rows included within a given row-column-modified subset includes only rows of pixels adjacent to each other within the input tile (and that map to a particular output pixel). In certain implementations, a pixel within a given row maps to more than one, but not all, output pixels of an output tile.

As mentioned, in certain described implementations, the fast median filter system identifies or determines corner pixels from an input tile. As used herein, the term "corner pixel" refers to a pixel from the input tile that is separate from a core subset of pixels, separate from extra columns of pixels, and separate from extra rows of pixels. In certain implementations, a corner pixel maps to only a single output pixel. Relatedly, the term "corner-modified subset" refers to a group of pixels that includes a core subset of pixels and one or more corner pixels. In some cases, a corner-modified subset includes a core subset of pixels, one or more groups of extra rows of pixels, one or more groups of extra columns of pixels, and one or more corner pixels.

In some implementations, the fast median filter system selects a middle number or a middle subset of pixels from a particular group of pixels. As used herein, the term "middle subset" (or "middle number" or "middle group" or "middle set") refers to a group of pixels that possibly or potentially include a median pixel value to represent a given output pixel. For example, a middle number or a middle subset of pixels includes a middlemost selection of pixels from a sorted list. In some cases, a middle number of pixels excludes pixels that are not possibly a median pixel value to represent a given output pixel. For instance, a middle number of pixels excludes pixels on either end of a sorted list which could therefore not possibly represent a median pixel value.

Additional detail regarding the fast median filter system will now be provided with reference to the figures. For example, FIG. 1 illustrates a schematic diagram of an example system environment for implementing a fast median filter system 102 in accordance with one or more implementations. An overview of the fast median filter system 102 is described in relation to FIG. 1. Thereafter, a more detailed description of the components and processes of the fast median filter system 102 is provided in relation to the subsequent figures.

As shown, the environment includes server(s) 104, a client device 108, a database 112, and a network 114. Each of the components of the environment communicate via the network 114, and the network 114 is any suitable network over which computing devices communicate. Example networks are discussed in more detail below in relation to FIG. 14.

As mentioned, the environment includes a client device 108. The client device 108 is one of a variety of computing devices, including a smartphone, a tablet, a smart television, a desktop computer, a laptop computer, a virtual reality device, an augmented reality device, or another computing device as described in relation to FIG. 14. Although FIG. 1 illustrates a single instance of the client device 108, in some implementations, the environment includes multiple different client devices, each associated with a different user (e.g., a digital image editor). The client device 108 communicates with the server(s) 104 via the network 114. For example, the client device 108 receives user input from a user interacting with the client device 108 (e.g., via the client application 110) to, for instance, edit, modify, or generate digital content, such as a digital image. Thus, the fast median filter system 102 on the server(s) 104 receives information or instructions to filter a digital image based on user interaction via the client device 108.

As shown in FIG. 1, the client device 108 includes a client application 110. In particular, the client application 110 is a web application, a native application installed on the client device 108 (e.g., a mobile application, a desktop application, etc.), or a cloud-based application where all or part of the functionality is performed by the server(s) 104. The client application 110 presents or displays information to a user, including an image editing interface for applying median filters to digital images. For example, a user interacts with the client application 110 to provide user input to generate a modified digital image by applying a median filter (having a user-selected filter size).

As illustrated in FIG. 1, the environment includes the server(s) 104. The server(s) 104 generates, tracks, stores, processes, receives, and transmits electronic data, such as digital image modifications and indications of user interactions. For example, the server(s) 104 receives data from the client device 108 in the form of an indication of a user interaction to select a filter size and/or to apply a median filter to a digital image. In addition, the server(s) 104 transmits data to the client device 108 to cause the client device 108 to display or present a filter size selection element and/or one or more modified, filtered digital images. For example, the server(s) 104 generate a filtered digital image by generating a median filter having a filter size according to a user selection and applying the median filter to a digital image. Indeed, the server(s) 104 communicates with the client device 108 to transmit and/or receive data via the network 114. In some implementations, the server(s) 104 comprises a distributed server where the server(s) 104 includes a number of server devices distributed across the network 114 and located in different physical locations. The server(s) 104 can comprise a content server, an application server, a communication server, a web-hosting server, a multidimensional server, or a machine learning server.

As further shown in FIG. 1, the server(s) 104 also includes the fast median filter system 102 as part of a digital content editing system 106. For example, in one or more implementations, the digital content editing system 106 can store, generate, modify, edit, enhance, provide, and/or share digital content, such as digital images or digital videos. For example, the digital content editing system 106 can crop, enhance, filter, or otherwise modify digital images based user input. In some implementations, the digital content editing system 106 supports the generation and application of median filters at the server(s) 104 or the client device 108. Indeed, in one or more implementations, the server(s) 104 includes all, or a portion of, the fast median filter system 102. In some cases, the fast median filter system 102 generates and provides a modified digital image to the client device 108 (e.g., as part of an image editing application). In these or other cases, the client device 108 includes all or part of the fast median filter system 102 to, for example, generate, obtain (e.g., download), and/or implement a median filter from the server(s) 104.

Indeed, in some implementations, as illustrated in FIG. 1, the fast median filter system 102 is located in whole or in part of the client device 108. For example, the fast median filter system 102 includes a web hosting application that allows the client device 108 to interact with the server(s) 104. To illustrate, in one or more implementations, the client device 108 accesses a web page supported and/or hosted by the server(s) 104. For example, the client device 108 provides a digital image to the server(s) 104 along with a request to generate a filtered digital image using a particular size of median filter, and, in response, the fast median filter system 102 on the server(s) 104 generates a median filter and a filtered digital image. The server(s) 104 then provides the filtered digital image to the client device 108 for display.

The digital content editing system 106 communicates with the client device 108 to perform various functions associated with the fast median filter system 102, such as storing and managing a repository of digital images, generating filtered digital images, and providing filtered digital images for display. Indeed, as further shown in FIG. 1, the environment includes the database 112. For example, the fast median filter system 102 communicates with the database 112 to access a repository of digital images and/or access or store pixel values associated with applying a median filter.

Although FIG. 1 illustrates a particular arrangement of the environment, in some implementations, the environment has a different arrangement of components and/or may have a different number or set of components altogether. For instance, as mentioned, the fast median filter system 102 is implemented by (e.g., located entirely or in part on) the client device 108 and/or a third-party device. For example, in one or more implementations, the client device 108 obtains (e.g., downloads) the fast median filter system 102 from the server(s) 104. Once downloaded, the fast median filter system 102 on the client device 108 filters images independent from the server(s) 104. In addition, in one or more implementations, the client device 108 communicates directly with the fast median filter system 102, bypassing the network 114. Further, in some implementations, the database 112 is located external to the server(s) 104 (e.g., in communication via the network 114) or located on the server(s) 104 and/or on the client device 108.

Figure 2:
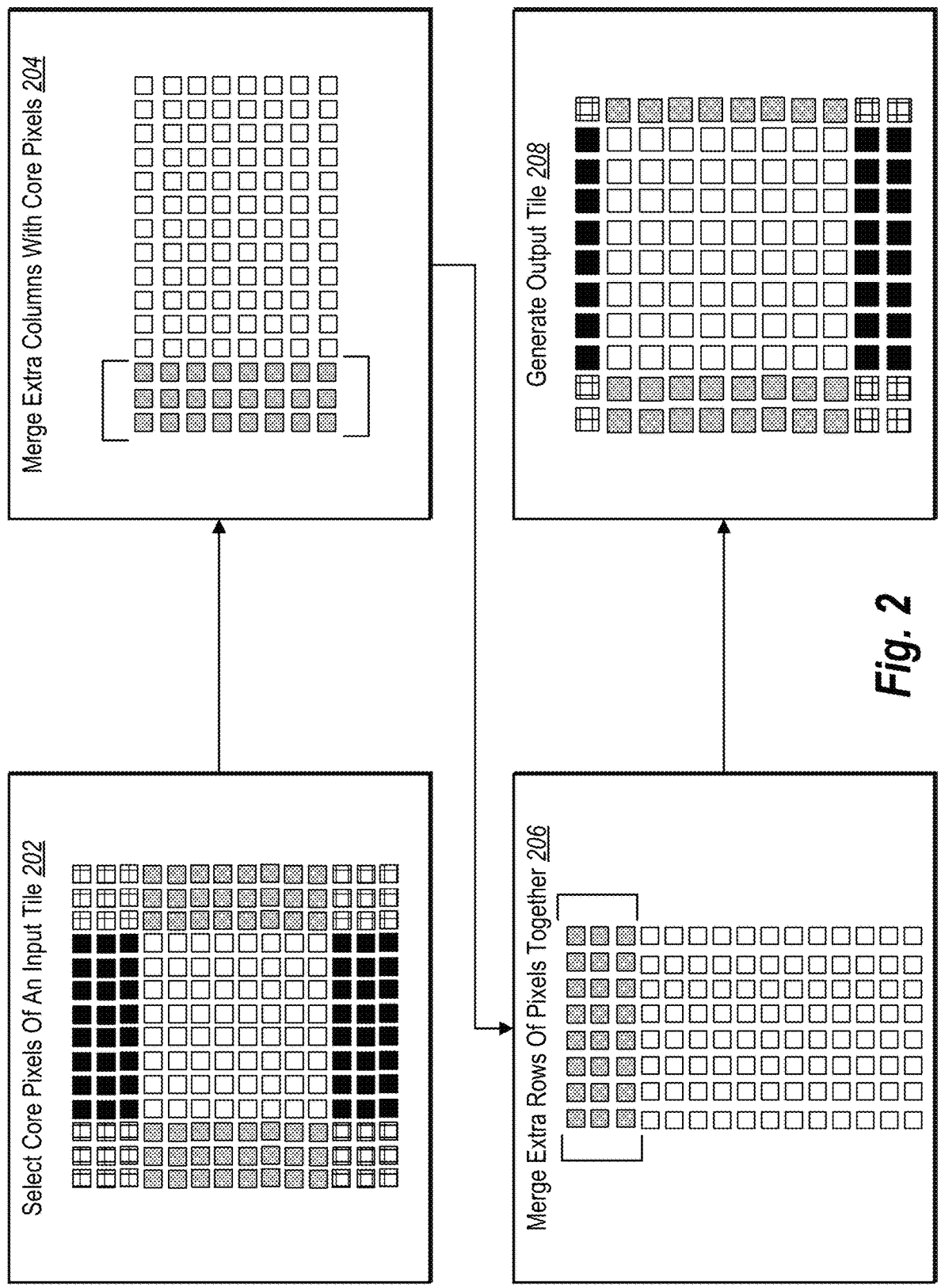
FIG. 2 illustrates an overview of generating an output tile by applying a median filter to a digital image in accordance with one or more implementations.

As mentioned, in one or more implementations, the fast median filter system 102 applies a median filter to a digital image to generate a filtered digital image. In particular, the fast median filter system 102 generates and applies a median filter using a fast, computation-sharing method unique from prior systems. FIG. 2 illustrates an example series of acts 202-208 for generating an output tile (of filtered output pixel values) from an input tile captured from a digital image by a median filter in accordance with one or more implementations. The description of FIG. 2 provides an overview of the process for generating an output tile by applying a median filter, and additional detail is provided thereafter in relation to subsequent figures.

As illustrated in FIG. 2, the fast median filter system 102 performs an act 202 to select core pixels of an input tile. More specifically, the fast median filter system 102 captures an input tile from a digital image by applying a median filter having particular dimensions (e.g., 7 pixels by 7 pixels, 11 pixels by 11 pixels, 29 pixels by 29 pixels, or some other size). In addition, the fast median filter system 102 analyzes the pixels of the input tile to identify those pixels that belong to a core subset of pixels.

To determine the core subset of pixels, the fast median filter system 102 determines a size of an output tile (e.g., 2 pixels by 2 pixels, 4 pixels by 4 pixels, or some other size). Based on the size of the output tile, the fast median filter system 102 determines which pixels of the input tile map to which output pixels of the output tile. Specifically, the fast median filter system 102 determines which input pixels could include a median pixel value for given output pixels. For example, the fast median filter system 102 identifies input pixels that map to only a single output pixel, input pixels that map to more than one output pixel, and input pixels that map to every output pixel. In some implementations, the fast median filter system 102 selects input pixels that map to every output pixel in a given output tile as the core subset of pixels.

In certain implementations, the fast median filter system 102 further sorts the core subset of pixels. For example, the fast median filter system 102 utilizes a sorting network such as a pairwise selection network to sort the core subset of pixels into an ordered list of pixel values. From the sorted list, the fast median filter system 102 selects a middle subset of pixels that contain a median pixel value among them. In some implementations, the fast median filter system 102 determines the number middle pixels to select by determining a number of pixel values that map to each output pixel from outside of the core subset. In certain cases, the fast median filter system 102 determines the number of middle pixels to select from the sorted list of core pixels to be one more than the number of pixel values that map to an output pixel from outside of the core subset.

As illustrated in FIG. 2, the fast median filter system 102 further performs an act 204 to merge extra columns with core pixels. In particular, the fast median filter system 102 determines extra columns of pixels from the input tile that are separate from the core subset of pixels. In some cases, the fast median filter system 102 determines the number of extra columns (and extra rows) to be one less than the size of the input tile. In addition, the fast median filter system 102 determines adjacent extra columns to combine or merge together into groups of extra columns of pixels utilizing a merge network. For instance, the fast median filter system 102 identifies adjacent extra columns as those columns that are immediately adjacent (e.g., bordering along a vertical edge) to one another as well as those columns that are on either side of the core subset of pixels (and would therefore be immediately adjacent if the core subset were removed).

In one or more implementations, the fast median filter system 102 merges the groups of extra columns with the core subset of pixels utilizing a merging network. Particularly, the fast median filter system 102 generates a number of column-modified subsets of pixels by combining each group of adjacent extra columns with the core subset of pixels, where a given column-modified subset includes the core subset and a respective group of extra columns. In addition, the fast median filter system 102 selects a middle number of pixels from each of the column-modified subsets.

Specifically, for a given column-modified subset, the fast median filter system 102 selects the middle number of pixels from a sorted list of pixel values from the column-modified subset. In some cases, the fast median filter system 102 selects a middle number of pixels that is one less than the number of remaining pixels of the input tile not yet analyzed for a given output pixel (e.g., outside of the core subset and outside of the extra columns).

As further illustrated in FIG. 2, the fast median filter system 102 performs an act 206 to merge extra rows of pixels together. More specifically, the fast median filter system 102 identifies extra rows of pixels from the input tile that are separate from the core subset of pixels. In addition, the fast median filter system 102 utilizes a sorting network to sort the extra rows of pixels (and/or the pixels within the extra rows of pixels). Based on sorting the extra rows, the fast median filter system 102 selects and merges adjacent extra rows of pixels together into groups of extra rows of pixels. For instance, the fast median filter system 102 determines adjacent rows as those rows that are immediately adjacent (e.g., bordering along a horizontal edge) to one another as well as those rows that are on either side of the core subset of pixels (and would therefore be immediately adjacent if the core subset were removed).

Additionally, the fast median filter system 102 performs an act 208 to generate an output tile. In particular, the fast median filter system 102 generates an output tile that includes a certain number of output pixels whose values are selected as median pixel values from respective groups of pixels that map to the output pixels. For a given output pixel, the fast median filter system 102 merges a group of extra rows of pixels with a corresponding column-modified subset of pixels to thereby generate a row-column-modified subset of pixels (which maps to the given output pixel).

In addition, the fast median filter system 102 identifies and selects a middle subset of pixels from the row-column-modified subset of pixels. Specifically, the fast median filter system 102 selects a middlemost subset of pixel values from a sorted list of pixel values from the row-column-modified subset of pixels. Additionally, the fast median filter system 102 identifies and sorts (e.g., utilizing a sorting network) extra corner pixels of input tile. For example, the fast median filter system 102 identifies and sorts corner pixels that map to only a single output pixel (e.g., the given output pixel) and that are separate from the core subset, the extra columns, and the extra rows of pixels.

The fast median filter system 102 further generates a corner-modified subset of pixels that includes the corner pixels combined with the row-column-modified subset of pixels (e.g., by merging the corner pixels with the row-column-modified subset utilizing a merge network). In addition, to determine the pixel value for the output pixel, the fast median filter system 102 determines a median pixel value from the corner-modified subset of pixels. In some cases, the fast median filter system 102 utilizes a sorting network such as a diagonal sorting network to determine and select the median pixel value from the corner-modified subset.

In certain implementations, the fast median filter system 102 repeats the act 208 for each output pixel of an output tile. Indeed, the fast median filter system 102 performs the act 208 to generate a single output pixel of an output tile. For additional output pixels of the output tile, (e.g., the remaining 15 pixels of a 4×4 output tile), the fast median filter system 102 repeats the process of: i) merging extra rows of pixels with a respective column-modified subset of pixels (to thereby generate a row-column-modified subset of pixels specific to a given output pixel), ii) selecting a middle subset of pixels from the row-column-modified subset, iii) sorting extra corner pixels, iv) generating a corner-modified subset of pixels, and v) determining a median pixel value from the corner-modified subset.

In one or more implementations, the fast median filter system 102 repeats the series of acts 202-208 for each output tile of a filtered digital image. To elaborate, the fast median filter system 102 slides a filter window of a median filter over a digital image to capture input tiles. From the input tiles, the fast median filter system 102 selects core pixels, merges extra columns, merges extra rows, and generates output tiles until the entire digital image is filtered. Thus, the fast median filter system 102 generates a filtered digital image to provide for display via the client device 108.

Figure 3:
FIG. 3 illustrates an example input digital image and an example digital image filtered using a fast median filter system in accordance with one or more implementations.

As just mentioned, in certain described implementations, the fast median filter system 102 generates and provides for display a filtered digital image. In particular, the fast median filter system 102 applies a fast median filter using the computation-sharing techniques described herein (e.g., in relation to FIG. 2) to generate a filtered digital image from an input digital image. FIG. 3 illustrates an example input digital image 302 and an example filtered digital image 306 in accordance with one or more implementations.

As illustrated in FIG. 3, the fast median filter system 102 applies a fast median filter to the input digital image 302. As shown, the input digital image 302 is a 16-bit digital image that includes certain details or depicted characteristics that are undesirable, such as frizzy hair, facial blemishes, and facial wrinkles. To reduce the frizzy hair, blemishes, and wrinkles, the fast median filter system 102 applies a median filter.

Indeed, FIG. 3 illustrates comparison tiles 304 to illustrate three example portions of the digital image that are modified as a result of applying a median filter. The left tile is from the input digital image 302, and the right tile is the result of applying the fast median filter system 102. For instance, the topmost comparison illustrates frizzy hair that is reduced by applying the fast median filter system 102. As another example, the middle comparison illustrates facial blemishes that are visibly reduced by applying the fast median filter system 102. As a final example, the bottom comparison illustrates facial wrinkles that are visibly reduced by applying the fast median filter system 102. As further illustrated in FIG. 3, the fast median filter system 102 generates the filtered digital image 306. Indeed, by applying the median filter, the fast median filter system 102 filters the input digital image 302 to generate the filtered digital image 306 that includes less frizzy hair, fewer facial blemishes, and smoother skin.

Experimenters have compared the generation of the filtered digital image 306 as performed by the fast median filter system 102 against conventional median filter systems. For the experiments, the experimenters used a filter size of 29×29 pixels for the depicted 16 bit image. At this bit depth and with this filter size, the fast median filter system 102 performs seven times faster than some conventional systems. Additionally, for other experiments, the fast median filter system 102 is up to 100 times faster at other filter sizes and bit depths.

Figure 4:
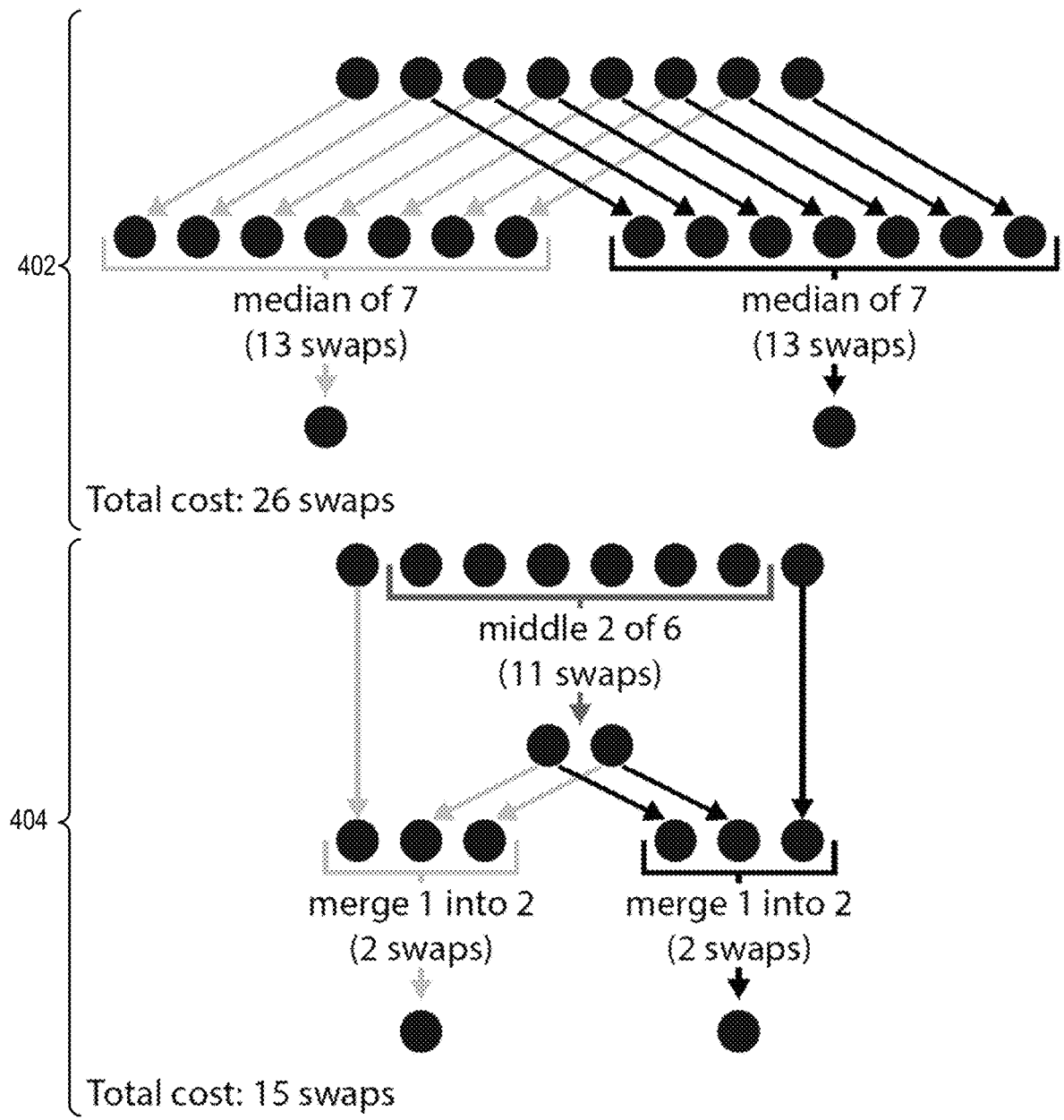
FIG. 4 illustrates an example of computation sharing between nearby pixels to reduce swap operations in accordance with one or more implementations.

As mentioned above, in certain described implementations, the fast median filter system 102 utilizes a computation-sharing technique to apply a median filter to a digital image. In particular, the fast median filter system 102 utilizes specialized separable sorting networks to factor the work by trimming or combining particular pixel calculations to reduce the computation expense of applying a median filter. FIG. 4 illustrates an example depiction of determining a median pixel value utilizing the computation-sharing technique described herein in accordance with one or more implementations. FIG. 4 provides a sample depiction of various operations for illustrative purposes, while later figures provide specific examples of processing an input tile to generate an output tile.

As illustrated in FIG. 4, there are two example methods depicted for determining a median pixel value from two overlapping windows (each window includes 7 pixels). First, the top method 402 utilizes an optimal number of swap operations for each window without sharing the computations between windows. Because the optimal number of swaps for determining a median of 7 values is 13, the total number of swaps for the two windows is 26 swaps (without any computation sharing). Some conventional media filter systems utilize the top method 402.

Second, the bottom method 404 reduces the number of swaps to a total of 15 by sharing computations among nearby pixels. Indeed, the fast median filter system 102 parallelizes across independent sorting tasks to share computations for overlapping windows of an input tile. For example, a median pixel value from among 7 pixel values is always going to be greater than 3 of the pixels values and less than 3 of the pixel values. Therefore, the fast median filter system 102 sorts (e.g., via a sorting network) the 6 pixel values that are shared at the intersection of the two windows.

Within the sorted 6 values, only the middle 2 pixel values could possibly be the median value (because the first 2 sorted values are less than 4 others, while the last 2 sorted values are greater than 4 others). Thus, to find a median of n values where k values are held out, the fast median filter system 102 need only consider the middlemost k+1 remaining values. As shown, finding the middlemost 2 of 6 in sorted order can be completed in 11 swaps. The fast median filter system 102 further utilizes 2 more swaps per output to determine the median pixel values for a total of 15 swaps.

By utilizing the techniques of FIG. 4, the fast median filter system 102 utilizes separable sorting networks to share the computations of applying a median filter. For a d×d filter, for example, the fast median filter system 102 exploits two types of separability for its sorting networks. First, per scanline of output, the fast median filter system 102 precomputes every sorted column of d pixels. Thus, rather than requiring computations within an unsorted array of size d for per-pixel tasks (like some conventional systems), the fast median filter system 102 starts from d sorted arrays of size d.

Second, the fast median filter system 102 computes outputs in small tiles that grow with the filter size. Thus, for larger median filters, the fast median filter system 102 generates larger output tiles. Within this paradigm, the fast median filter system 102 performs the most work at the intersection of footprints (e.g., pixels of an input tile that map to particular output pixels) of all output pixels in an output tile. The fast median filter system 102 thus performs less work in parts of footprints that are common to only a subset of the output pixels, and performs the least work for parts of the footprints unique to single output pixels.

Figure 5:
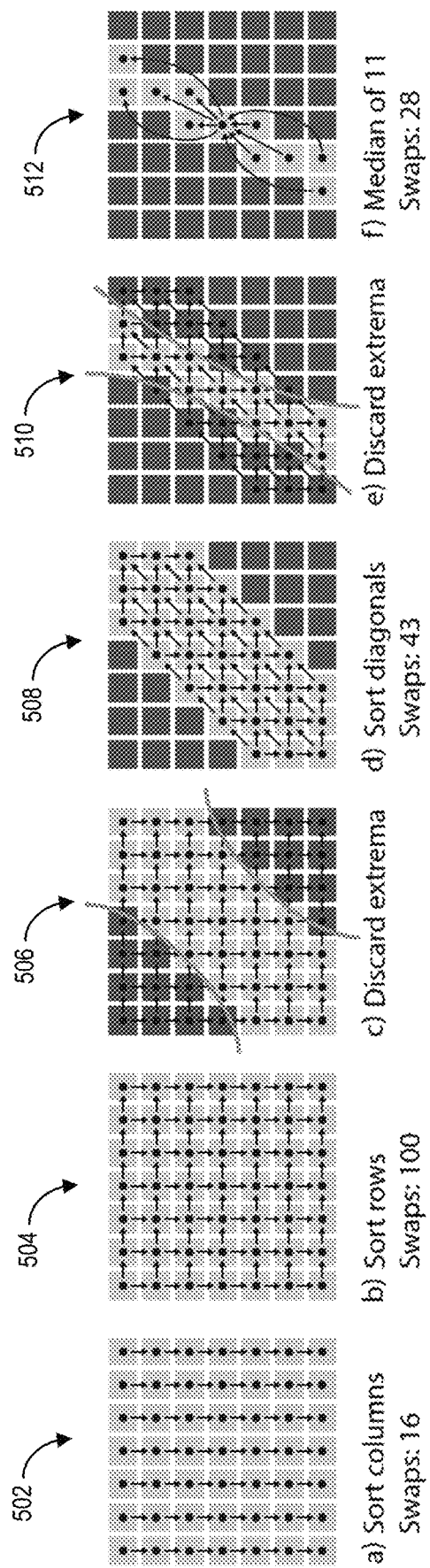
FIG. 5 illustrates an example process for a diagonal sorting network in accordance with one or more implementations.

As mentioned, in certain implementations, the fast median filter system 102 utilizes sorting networks to sort and select pixels (e.g., middle pixels and median pixel values). In particular, the fast median filter system 102 sorts pixels according to their pixel values to more easily identify and select those pixels that could represent median pixel values. FIG. 5 illustrates an example series of acts 502-512 that the fast median filter system 102 performs as part of implementing a specialized diagonal sort (e.g., for selecting median pixel values) as part of filtering a digital image in accordance with one or more implementations. FIG. 5 illustrates sorting an input tile including a particular number of pixels values (e.g., 7×7 pixels), but other input tile sizes are possible depending on the size of median filter applied to a digital image.

As illustrated in FIG. 5, the fast median filter system 102 performs an act 502 to sort columns of an input tile. In particular, the fast median filter system 102 utilizes a sorting network such as a pairwise selection network pruned to the output range of interest. As one form of separability (mentioned above), the input tile illustrated in the act 502 overlaps with other nearby pixels in the same scanline, so the fast median filter system 102 precomputes these sorted columns per scanline of output, resulting in an amortized cost of sorting one additional column of pixels. As depicted in FIG. 5, the arrows indicate the ordering relationship, where the arrows point to larger values. For an input tile of the depicted size, the fast median filter system 102 performs 16 swap operations to sort the columns.

As also illustrated in FIG. 5, the fast median filter system 102 performs an act 504 to sort rows of an input tile. For example, the fast median filter system 102 utilizes a sorting network to sort the pixels or pixel values within the rows of the input tile. In sorting the rows, the fast median filter system 102 maintains or preserves the sorting of the columns determined as part of the act 502. In other words, sorting the rows does not unsort or scramble the order of the columns. As depicted in FIG. 5, the arrows point in the direction of increasing pixel values.

For the depicted input tile, the fast median filter system 102 performs 100 swaps to sort the rows. In performing the 100 swaps (100 is not a multiple of the number of rows), the fast median filter system 102 anticipates the exclusion that occurs in the act 506 and therefore saves some computations by reducing the number of swaps accordingly. For the top row, for instance, the fast median filter system 102 utilizes a sorting network that gives the top 3 of 7 rather than a sorting network that sorts the entire row. Similarly, for the bottom row, the fast median filter system 102 utilizes a sorting network that gives the bottom 3 of 7 (because the other 4 will be discarded in the act 506).

As further illustrated in FIG. 5, the fast median filter system 102 performs an act 506 to discard extrema. More specifically, because sorted pixel values within the input tile increase down and to the right, the fast median filter system 102 excludes (or removes from consideration) hyperbolic slices of pixel values that could not possibly include a median pixel value. Indeed, the fast median filter system 102 excludes a hyperbolic slice in the upper left (as being less than too many other values to possibly be a median) and another hyperbolic slice in the lower right (as being greater than too many other values to possibly be a median).

In addition, the fast median filter system 102 performs an act 508 to sort diagonals. In particular, the fast median filter system 102 utilizes a sorting network such as a diagonal sorting network to sort up and to the right along each diagonal of remaining (e.g., non-discarded) pixel values. In sorting the diagonals, the fast median filter system 102 preserves the sorting of the rows and columns performed as part of the act 502 and the act 504. As shown, the direction of the arrows indicate increasing pixel values. For the input tile depicted in FIG. 5, the fast median filter system 102 performs 43 swap operations to sort the diagonals.

As illustrated in FIG. 5, the fast median filter system 102 performs an act 510 to discard extrema. More specifically, the fast median filter system 102 excludes, or removes from consideration, those pixel values in the sorted diagonals that are not possibly the median pixel value. For example, the fast median filter system 102 identifies hyperbolic slices of pixel values to the left and right that include pixel values that are less than too many other values to possibly include the median or greater than too many other values to possibly include the median.

As further illustrated in FIG. 5, the fast median filter system 102 performs an act 512 to determine the median of the remaining pixel values. For example, the fast median filter system 102 utilizes a sorting network (e.g., a pairwise selection network) to determine the median of the remaining pixel values. As shown, applying the pairwise selection network requires 28 swaps to determine the median pixel value for the input tile.

To elaborate on the sorting of the diagonals, in some implementations, the acts 502-512 can be expressed in mathematical notation. For example, to sort n pixel values for outputs at indices $\alpha$ through $\beta$, the fast median filter system 102 performs the following enumerated operations. I) The fast median filter system 102 arranges the input pixel values in a rectangle of width w and height h, where w×h=n. II) The fast median filter system 102 sorts down each column using a primitive sorting network such as a pairwise selection network. III) The fast median filter system 102 sorts along each row from left to right using a primitive sorting network such as a pairwise selection network. IV) The fast median filter system 102 excludes a value at i, j from further consideration if:

$g > \beta$ or $l > n - 1 - \alpha$ where the value at i, j (counting from zero) is greater than or equal to the $g=(i+1)(j+1)$ values above and to the left (including itself), and less than or equal to the $l=(w-j)(h-i)$ values below and to the right. V) The fast median filter system 102 sorts the remaining pixel values along diagonals up and to the right, taking care to treat excluded values as $\pm\infty$ in this sort, shuffling them to the top left or bottom right of the diagonals (if w>h, the fast median filter system 102 transposes before this step or sorts down and to the left while adjusting the rest of the algorithm accordingly). VI) At this point, each value is greater than or equal to every other value in the shaded directions ◐ or ◑. Thus, the fast median filter system 102 counts these values and compares the counts to the same thresholds as in step iv): $\beta$ and $n-1-\alpha$, thus excluding two hyperbolic slices. The fast median filter system 102 further anticipates exclusion to reduce sorting networks to computationally cheaper networks (for diagonals where no values are excluded, the fast median filter system 102 refrains from sorting altogether). VII) The fast median filter system 102 determines a median pixel value from the remaining pixel values by applying a pairwise selection network to extract the precise range of interest. In some cases, the fast median filter system 102 prunes the pairwise selection network by exploiting orders that already exist among the remaining values.

To reduce the computational requirements of the above algorithm, the fast median filter system 102 utilizes a tiling approach to share overlapping work. More specifically, rather than generating single pixel outputs, the fast median filter system 102 generates outputs in the form of output tiles to share work across output pixels of the output tile. To this end, the fast median filter system 102 applies the diagonal sorting network to the intersection of the footprints of the pixels in the output tile. To set α and β for each step, the fast median filter system 102 utilizes the middlemost k+1 principle, where the median pixel value could only be one of the middlemost k+1 pixel values, where k represents the number of values not yet seen.

To perform one or more of the acts 502-512 (e.g., the act 502 or the act 504) described in FIG. 5, the fast median filter system 102 determines particular sorting networks to implement for sorting columns and/or rows. For example, to sort sizes up to 16 pixel values, the fast median filter system 102 utilizes a sorting network from the best-known networks provided by Donald E. Knuth in *The Art of Computer Programming*, Fundamental Algorithms, Vol. 1 (1998), which is hereby incorporated by reference in its entirety. For other tasks, such as the sorting of the acts 508 and 512, the fast median filter system 102 selects a specialized sorting network, such as the diagonal sorting network, a sorting network with fused or deleted swap operations, or a sorting network modified to share computations across overlapping windows or overlapping input tiles.

In one or more implementations, the fast median filter system 102 determines which sorting network to apply for which operation. For example, the fast median filter system 102 performs a branch-and-bound search over sequences of swaps to find the shortest path from an initial state to a goal state and selects the sorting network that results in the fewest swaps.

For sorting networks with 8 inputs and above, the direct search is often too slow, and the fast median filter system 102 therefore searches for a shorter alternative for each overlapping window of 7 swaps. For each sub-task, the initial bitmask can be derived from running the network up to the start of the window, and the goal of the bitmask can be derived by running the network in reverse from the end of the network back to the end of the window. This method is effective for producing sorting networks with up to 13 inputs.

In certain implementations, the fast median filter system 102 fuses or deletes swaps for larger sorting networks. For example, the fast median filter system 102 simplifies larger networks by first checking, for all swaps, if the network validates with that swap removed. The fast median filter system 102 further attempts to fuse swaps. For all pairs of swaps (i,j), (j,k), the fast median filter system 102 deletes both and then inserts the swap (i,k) in place of either the first or the second swap, validating to test the network. The fast median filter system 102 similarly attempts to fuse swaps (i,j), (k,i) to test which fused swaps still validate.

Figure 6:
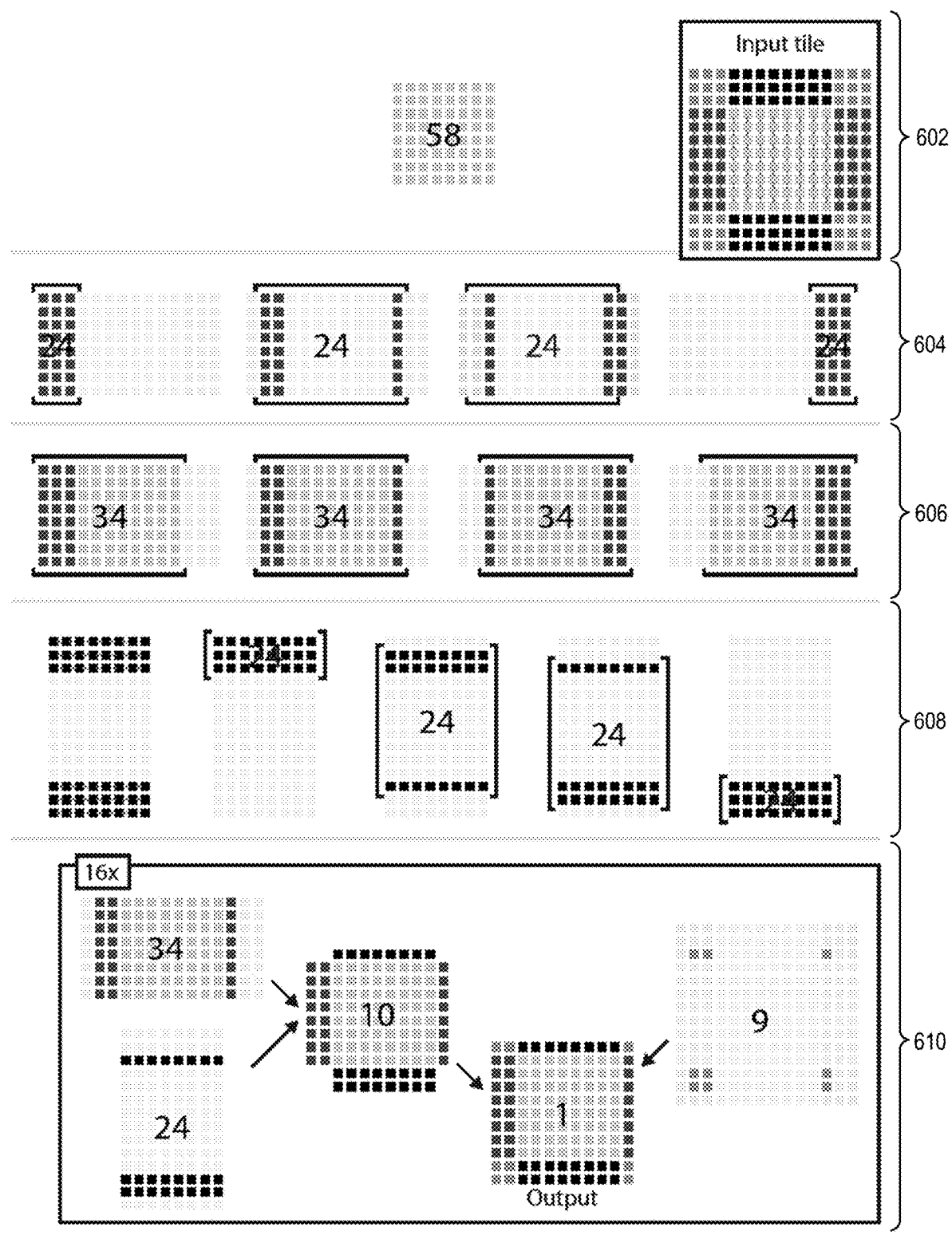
FIG. 6 illustrates an example process for generating an output tile from an input tile in accordance with one or more implementations.

As mentioned above, in certain described implementations, the fast median filter system 102 generates a modified digital image by applying a median filter to generate a number of output tiles that make up the modified digital image. In particular, the fast median filter system 102 generates an output tile from an input tile captured from a digital image by a median filter. FIG. 6 illustrates example stages 602-610 of operations for generating an output tile from an input tile captured from a digital image in accordance with one or more implementations. While FIG. 6 illustrates a particular example with a particular size of input tile (11×11 pixels) and output tile (4×4 pixels), the fast median filter system 102 is similarly effective for arbitrarily sized input tiles and output tiles. Through the process illustrated in FIG. 6, applying the median filter has an amortized cost of just under 252 swaps per output pixel, while a conventional pairwise median-finding network on an 11×11 input tile requires 1001 swaps.

Indeed, FIG. 6 illustrates an input tile in a square shape that includes a number of pixels captured from a digital image. From the input tile, the fast median filter system 102 determines which pixels could possibly include median pixel values to represent output pixels to include within an output tile. Specifically, the fast median filter system 102 determines footprints for each output pixel of the output tile by determining which pixels from the input tile map to which output pixels (e.g., which input pixels could possibly by a median pixel value for which output pixels).

As illustrated in FIG. 6, the fast median filter system 102 performs operations at stage 602 to select a core subset of pixels from the input tile, sort the core subset of pixels, and keep or preserve a middle group or a middle set of pixels from the core subset. In particular, the fast median filter system 102 determines the core subset of pixels as those pixels from the input tile that map to (or are in the footprint of) each output pixel of the output tile (e.g., that could possibly include a median pixel value for any of the output pixels). As shown, the fast median filter system 102 identifies the core subset as an 8×8 square of pixels from the input tile and determines that the other pixels do not map to every output pixel (and thus excludes them from the core subset).

In addition, the fast median filter system 102 sort the core subset of pixels. For instance, the fast median filter system 102 utilizes a sorting network such as one of the sorting networks described above to sort the core subset of pixels. The fast median filter system 102 further selects or preserves a middle set or a middle group of pixels from the sorted core. In particular, the fast median filter system 102 utilizes a sorting network to identify and select a middlemost number of pixels. As shown, the fast median filter system 102 selects 58 pixels from the core subset of 8×8 pixels.

As further illustrated in FIG. 6, the fast median filter system 102 performs operations at stage 604 to merge extra columns of pixels with the selected middle pixels from the core subset. More specifically, the fast median filter system 102 identifies extra columns of pixels within the input tile that are not part of the core subset. In addition, the fast median filter system 102 merges the extra columns together into groups of extra columns.

For instance, the fast median filter system 102 merges the extra columns into a number of groups corresponding to a dimension of the output tile (e.g., 4 groups of extra columns corresponding to the 4×4 output tile), where each group includes a number of extra columns that is one fewer than the width of the output tile (e.g., 3 columns for example in FIG. 6). In some cases, the fast median filter system 102 merges adjacent columns together, where adjacent columns are columns of pixels that border each other along a vertical edge and/or are on either side of the core subset of pixels within the input tile. Indeed, as shown in FIG. 6, the fast median filter system 102 generates 4 groups of extra columns, where the leftmost group includes the three adjacent columns to the left of the core subset, the next group includes two of the columns to the left of the core subset and one immediately to the right of the core subset, and so on.

Additionally, the fast median filter system 102 performs operations at stage 606 to merge the groups of extra columns with the core subset of pixels (or with the middle number of pixels kept from the core subset). Indeed, the fast median filter system 102 generates a number of column-modified subsets of pixels by merging groups of extra columns of pixels with the core subset. As shown, the fast median filter system 102 generates 4 column-modified subsets, one for each of the columns of the 4×4 output pixel.

From each of the column-modified subsets, the fast median filter system 102 further identifies or selects a middle number of pixels. More specifically, the fast median filter system 102 selects a middle number of pixels from sorted lists of pixel values of each of the column-modified subsets. Indeed, the fast median filter system 102 selects and preserves those middlemost pixel values that are possibly median values for corresponding output pixels.

As further illustrated in FIG. 6, the fast median filter system 102 performs operations at stage 608 to sort and merge extra rows of pixels from the input tile. To elaborate, the fast median filter system 102 identifies extra rows of pixels from the input tile as rows that are not included within the core subset of pixels. In addition, the fast median filter system 102 utilizes a sorting network to sort the extra rows of pixels. In some cases, the fast median filter system 102 utilizes a sorting network as described above.

Further, the fast median filter system 102 utilizes a merge network to merge the extra rows together into groups of extra rows of pixels. Particularly, the fast median filter system 102 combines the extra rows together into a number of groups corresponding to a number of rows in the output tile. As shown in FIG. 6, for instance, the fast median filter system 102 generates 4 groups of extra rows of pixels for the 4×4 output tile. Additionally, the fast median filter system 102 merges a number of rows for each group to be one less than the number of rows in the output tile (e.g., groups of 3 extra rows for the 4×4 output pixel).

In some cases, the fast median filter system 102 merges or combines only adjacent rows after sorting. For example, the fast median filter system 102 merges the topmost three extra rows that border one another along a horizontal edge. As another example, the fast median filter system 102 merges two rows above the core subset and a third row beneath the core subset (e.g., where the rows are adjacent if the core subset is removed).

As further illustrated in FIG. 6, the fast median filter system 102 performs a number of operations at stage 610 to generate the output tile. In particular, for each pixel of an output tile, the fast median filter system 102 determines a median value. To determine a given median value for a given output pixel, the fast median filter system 102 performs several acts. For instance, the fast median filter system 102 generates a row-column-modified subset of pixels by combining or merging a group of extra rows of pixels with a selected middle number of pixels from a corresponding column-modified subset of pixels. In addition, the fast median filter system 102 selects a middle subset of pixels from the row-column-modified subset that could possibly contain the median pixel value. The fast median filter system 102 further sorts extra corner pixels from the input tile and merges the extra corner pixels with the selected middle subset to generate a corner-modified subset. For instance, the fast median filter system 102 identifies corner pixels mapping to a particular output pixel, utilizes a sorting network to sort them, and utilizes a merge network to merge them with a middle subset selected from a row-column-modified subset. The fast median filter system 102 then determines a median pixel value from the corner modified subset of pixels utilizing a sorting network as described above.

The fast median filter system 102 repeats the acts involved in generating a median value for an output pixel for each output pixel of an output tile. As shown in FIG. 6, for instance, the fast median filter system 102 repeats the acts 16 times for the 4×4 output tile. Indeed, for each output pixel, the fast median filter system 102 generates a row-column-modified subset by merging a respective group of extra rows with a corresponding middle number of pixels selected from a column-modified subset, selects a middle subset from the row-column-modified subset, sorts extra corner pixels that map to the given output pixel, generates a corner-modified subset of pixels by merging the extra corner pixels with the selected middle subset of pixels from the row-column-modified subset of pixels, and determines a median pixel value from the corner-modified subset utilizing a sorting network. Using this repeated process for each output pixel, the fast median filter system 102 generates an output tile of median pixel values.

Additionally, the fast median filter system 102 repeats the generation of an output tile for a number of tiles to generate a modified, filtered digital image. For instance, the fast median filter system 102 slides a median filter across scanlines of a digital image to capture multiple input tiles. From the input tiles, the fast median filter system 102 generates corresponding output tiles to generate the filtered version of the digital image.

As described in relation to FIG. 6, the fast median filter system 102 generates an output tile by applying or executing a full-tiled median filter algorithm. The full-tiled median filter algorithm can also be expressed in mathematical notation. For example, the fast median filter system 102 generates an output tile from an input tile utilizing a filter with diameter d and an output tile size of w×h by performing the following operations. I) For each strip of h scanlines, in parallel, the fast median filter system 102 vertically sorts columns of d−h+1 pixels centered on the h pixels in the scanline. II) The fast median filter system 102 diagonally sorts overlapping windows of size (d−w+1)×(d−h+1), setting $\alpha$ and $\beta$ such that we keep the middlemost $d^2-(d-w+1)(d-h+1)+1$, which is one more than the number of pixel values not included in the diagonal sort. This is referred to as the sorted core subset of pixels, and it covers the intersection of the footprints of the pixels in the output tile. III) For each of the w columns of the output tile, the fast median filter system 102 gathers w−1 sorted columns in the intersection of the footprints over a given column (that were not already included in the sorted core subset of pixels) and merge them into a single sorted list. Into each of these groups of columns, the fast median filter system 102 merges the sorted core subset of pixels, keeping the middlemost d(d−h+1)+1 pixel values for subsequent steps. IV) The fast median filter system 102 gathers and sorts the closest 2(h−1) rows of width (d−w+1), centered at the output of the tile, that were not already included in step II. V) For each row of the output tile, the fast median filter system 102 merges into a group the h−1 sorted rows from the previous step that lie within the intersection of the footprints (but were not already included in the sorted core subset of pixels) across the given row. VI) For each output pixel of the output tile, the fast median filter system 102 merges the appropriate bundle of sorted rows from the previous step with the sorted columns and core subset from step III, keeping the middlemost (w−1)(h−1)+1 pixel values. The fast median filter system 102 also gathers and sorts the (w−1)(h−1) values covered by the footprint mapping to the given output pixel not already included in the previous steps. In addition, the fast median filter system 102 merges these two lists, keeping only the median pixel value for the output pixel.

As described herein, in one or more implementations, the fast median filter system 102 utilizes merge networks to merge sorted pixel values. In particular, the fast median filter system 102 merges sorted lists of pixel values sorted via sorting filters. To merge two sorted lists, for example, the fast median filter system 102 utilizes a merge step of the odd-even merge network described by Kenneth E. Batcher in Sorting Networks and their Applications, Proceedings of the Apr. 30-May 2, 1968 *Spring Joint Computer Conference*, 307-14 (1968), which is hereby incorporated by reference in its entirety. For merging n sorted lists, on the other hand, the fast median filter system 102 merges the lists pairwise in a binary tree. In cases where the lists are the same size, the fast median filter system 102 generates a sorting network of size n and interprets each swap (i,j) of the network as a directive to merge lists i and j in place.

As mentioned, in one or more implementations, the fast median filter system 102 exploits the k+1 principle when merging two lists of different sizes and where only a small number of outputs is needed (e.g., a median pixel value). To elaborate, for two sorted lists of size n−k and k, the fast median filter system 102 selects outputs at indices α through β inclusive (counting from index 0), and the largest output of interest is greater than exactly β other values from the union of both lists. The fast median filter system 102 thus ignores or excludes any value at an index greater than β in either list because the value is greater than too many other values to possibly be a median (or possibly be in a middle number of pixels). As a result, the fast median filter system 102 trims down each list to at most size β+1 before starting a merge. The fast median filter system 102 applies a similar approach to a to trim the start of each list.

In the special case of median finding to select a median pixel value, the fast median filter system 102 trims lists of pixel values according to the following principle: when searching for a median of n pixel values, where only n−k pixel values have been analyzed so far, then only the middlemost k+1 of those pixel values could be the median, and the fast median filter system 102 discards the other pixel values.

In certain described implementations, the fast median filter system 102 utilizes median filters with non-square footprints (e.g., that capture non-square input tiles for non-square output tiles). The algorithm described above in relation can be defined in terms of intersections and unions of footprints and should therefore generalize to non-square footprints. In some cases. the sorted core subset of pixels must cover a rectangular footprint for the diagonal sort to work and in order to share the cost of sorting the extra columns. Thus, for the core subset, the fast median filter system 102 utilizes the largest rectangle that fits within the intersection across the tile. The fast median filter system 102 further utilizes the extra pixel values that lie within the core but outside this rectangle during the last pairwise selection step in the diagonal sorting network. There will also be similar extra pixel values to include in step III above that lie outside the core, within the intersection across the column of outputs, but are not already included in the presorted column. The fast median filter system 102 thus merges these values into the sorted column in step III.

Figure 7:
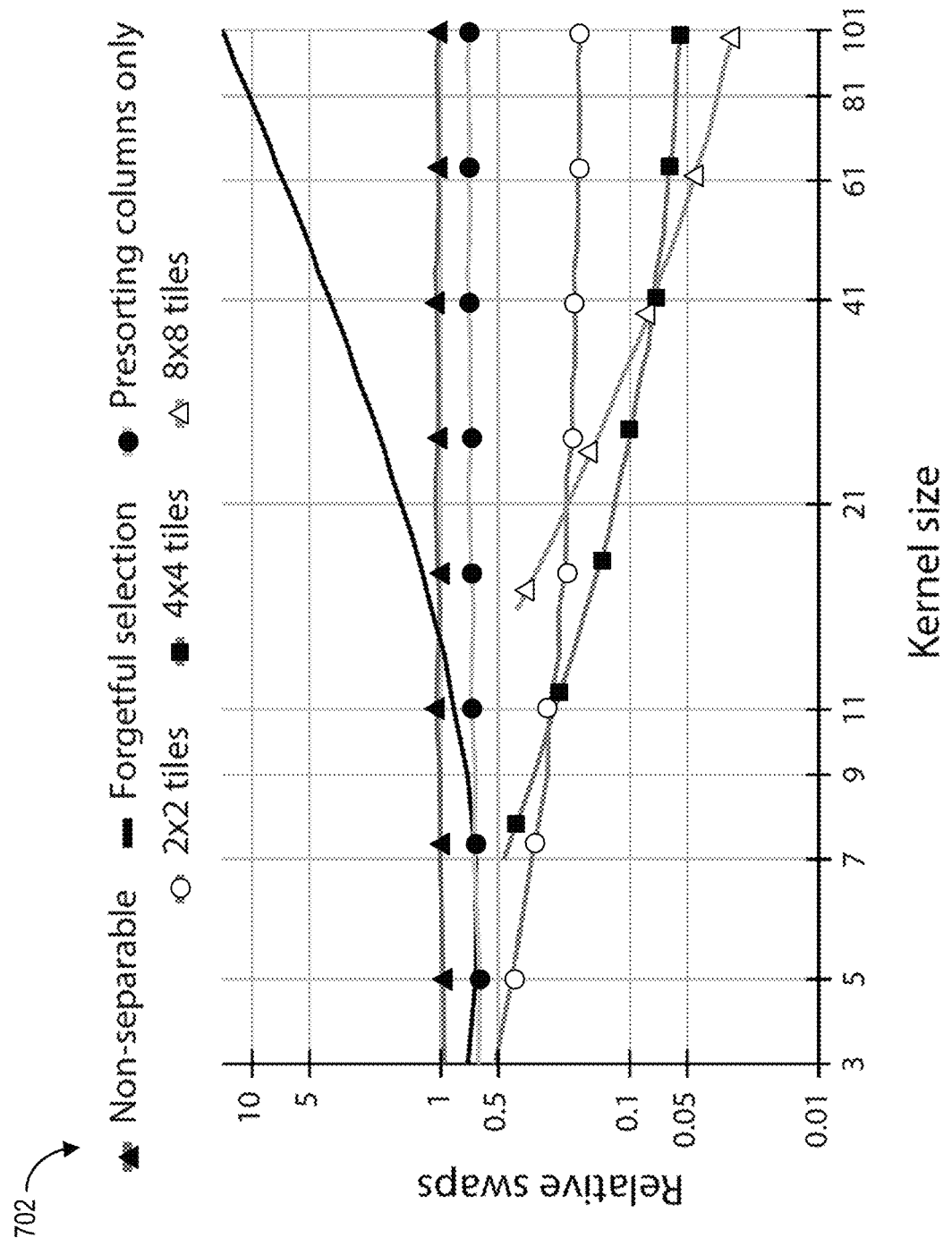
FIG. 7 illustrates an example table of performance metrics for the fast median filter system in accordance with one or more implementations.

As mentioned above, implementations of the fast median filter system 102 improve in computational efficiency over conventional systems. In particular, the fast median filter system 102 reduces the number of swap operations performed for generating a modified digital image using a median filter. FIG. 7 illustrates a table 702 of experimental results depicting numbers of swap operations performed by variations of the fast median filter system 102 and certain conventional systems in accordance with one or more implementations.

As illustrated in FIG. 7, the table 702 includes results for three different variations of the fast median filter system 102: i) a 2×2 tile size variation, ii) a 4×4 tile size variation, and iii) an 8×8 tile size variation. In addition, the table 702 includes results for three different conventional median filter systems: i) non-separable sorting networks without presorting the columns, ii) a forgetful selection network described by Gabriel Salvador, Juan M. Chau, Jorge Quesada, and Cesar Carranza in *Efficient GPU-Based Implementations of the Median Filter based on a Multi-Pixel-Per-Thread Framework*, 2018 IEEE Southwest Symposium on Image Analysis and Interpretation, 121-24 (2018), and iii) presorting columns only without separable sorting networks. In performing the experiments, researchers normalized the number of swap operations against the number required by a pairwise selection network. As shown, the variations of the fast median filter system 102 exhibit improved computational efficiency by requiring fewer swap operations compared to the conventional systems.

Regardless of the size of the output tile (e.g., 2×2, 4×4, 8×8, or some other size), the fast median filter system 102 benefits from the computation-sharing technique described herein (including the sorting and merging of a core subset of pixels, extra columns of pixels, extra rows of pixels, and corner pixels). As a result, and as shown in table 702, researchers have demonstrated the computational improvements in requiring fewer swaps for the fast median filter system 102 as compared to various conventional systems.

Figure 8A:
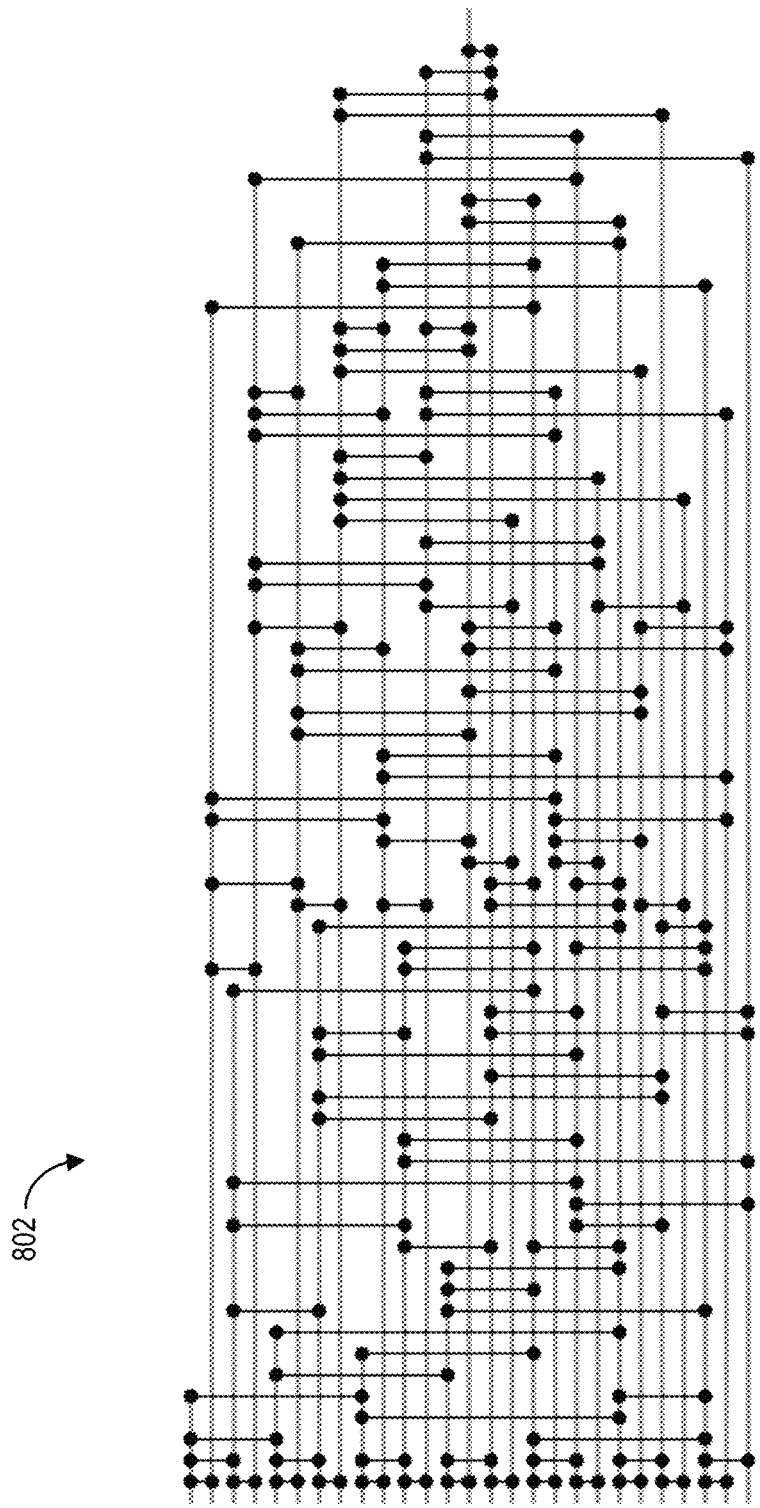
FIGS. 8A-8B illustrate a comparison of operations performed by a conventional system and operations performed by the fast median filter system in accordance with one or more implementations.
Figure 8B:
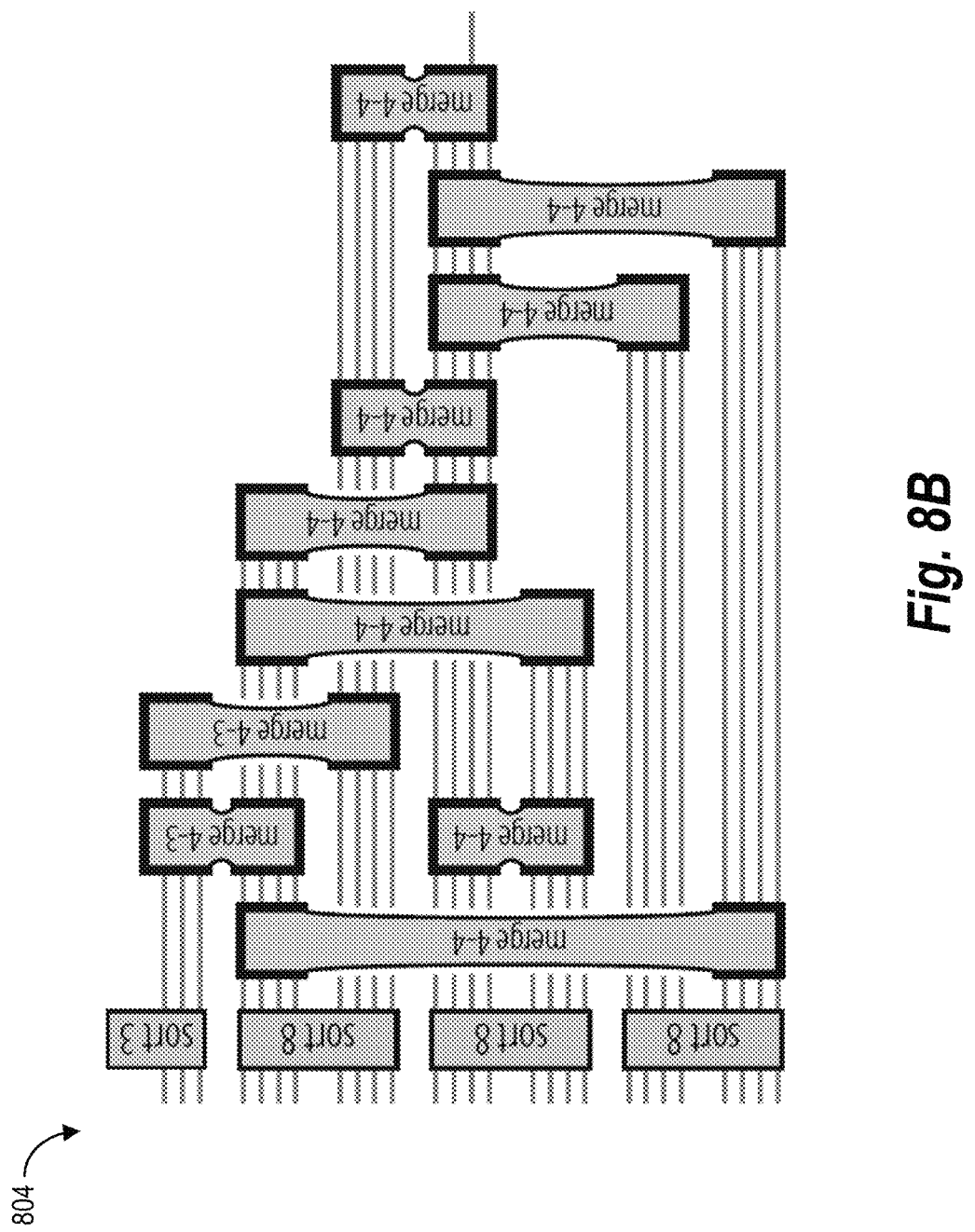

As mentioned above, in certain described implementations, the fast median filter system 102 utilizes an interpreter to implement a median filter for generating a modified digital image. In particular, rather than using a compiled approach of conventional systems to generate a new median filter for each new filter size (which can take several minutes each time), the fast median filter system 102 reduces the number of CPU and/or GPU cycles by reducing the number of memory operations and by utilizing an interpreter. FIGS. 8A-8B illustrate an example comparison of operations performed by a conventional median filter and operations performed by the fast median filter system 102.

As illustrated in FIG. 8A, a conventional median filter system determines a median of 27 pixel values using the operations shown. For example, the operation diagram 802 depicts one pixel value per horizontal line for a total of 27 pixel values. The conventional system compares the pixel values and performs a swap operation for each pixel value out of order, as indicated by the vertical lines. As shown, the conventional system performs 111 swap operations to determine the median of 27 values. However, the conventional system also performs 222 memory operations to either store a value into a memory register or load a value from a memory register as part of the median determination. In many cases, memory operations are more computationally expensive (and slower) than swap operations.

As illustrated in FIG. 8B, the fast median filter system 102 reduces the number of memory operations required to apply a median filter. Specifically for the case of determining a median of 27 pixel values, the fast median filter system 102 reduces the number of memory operations from 222 (as shown in FIG. 8A) to 105. Even though the fast median filter system 102 increases the number of swap operations (from 111 to 148), the exchange for the decrease in memory operations nevertheless improves computation cost and time.

To only perform a limited number of memory operations, the fast median filter system 102 generates a modified median filter by inflating a template median filter according to a filter size. For instance, the fast median filter system 102 receives an indication of user selection for a filter size (e.g., via a filter size slider bar within a digital image editing interface), and in response, the fast median filter system 102 generates a median filter having the selected filter size by inflating a template median filter. In some cases, the fast median filter system 102 inflates the template median filter according to the selected filter size (e.g., to scale the template median filter) by a particular factor based on a processor used to apply a median filter. For example, the fast median filter system 102 determines a processor type and/or empirically determines the inflation factor by determining, from among a number of possible inflation factors, which inflation factor is fastest for the processor type. In some cases, the fast median filter system 102 determines a size for the template median filter based on a desired median filter size (e.g., a desired median filter size divided by the inflation factor, rounding up).

Specifically, the fast median filter system 102 inflates the template median filter by generating large sort and merge operations out of combinations of smaller ones. As shown in FIG. 8B, for example, the fast median filter system 102 generates larger sort and merge operations from corresponding operations of FIG. 8A. For instance, the fast median filter system 102 replaces each pixel value within the network shown in FIG. 8A with a group of four pixel values to generate the network shown in FIG. 8B. Thus, the fast median filter system 102 fuses sort operations from the operation diagram 802 into operations that merge two sorted lists of size four, as shown in the operation diagram 804 (e.g., the merge 4-4 and merge 4-3 operations).

As further shown in the operation diagram 804, the fast median filter system 102 sorts each group of four pixel values, or that sort can be fused into the first merge operation that touches those inputs (e.g., the sort-8 links). The fast median filter system 102 further trims unused input capacity (the fast median filter system 102 is selecting a median of 27 pixel values rather than 28) by treating values at the top as ∞ and by simplifying the operations that touch those values. The fast median filter system 102 loads at most 8 values into registers for each operation in the network of FIG. 8B, performs some swap operations, and then stores the values again.

To execute an inflated median filter, the fast median filter system 102 runs an interpreter loop over a bytecode which encodes the operations to perform. For the approach of FIG. 8B, the fast median filter system 102 uses one third more swaps than the pairwise network of FIG. 8A but executes fewer than half as many memory operations.

In one or more implementations, the fast median filter system 102 utilizes a particular instruction set to implement a median filter using an interpreter. For example, the fast median filter system 102 operates in an unbounded linear memory space with input data from an input tile preloaded into the space starting at index 0, where the instruction set is as follows:
1) Sort(start, size, α, β): sorts size values in place starting at address start, where only indices α through β in the output need to be correct (the others are undefined).
2) Merge(start1, size1, start2, size2, α, β): merges two already sorted, non-overlapping sequences, overwriting the first sequence with the smaller size1 values, and overwriting the second sequence with the larger values. Only indices α through β in the output need to be correct (the others are undefined).
3) Copy(src, step, size, dst): copies size values starting at src with stride step to a dense sequence starting at dst.

This is useful for making copies of values that will be consumed by multiple in-place operations, and also for compacting strided sequences so that they can be sorted or merged. The step parameter can be positive or negative.

In some implementations, the fast median filter system 102 limits a maximum instruction size. To lower a list of instructions to bytecode for a high-performance interpreter, for instance, the fast median filter system 102 concretizes the sorting network and merging network used for each Sort and Merge operation. In some cases, the interpreter can only support a finite list of sizes for the Sort and Merge operations, so the fast median filter system 102 decomposes operations into smaller ones (without reducing back to individual swaps and preventing loss of the benefit of coarser-grained instructions).

In certain cases, the fast median filter system 102 decomposes a Sort operation of size n to meet a size limit k. For example, the fast median filter system 102 breaks the n inputs into [n/k] leaf sequences of size (at most) k and sorts each pair of leaves together using sort instructions of size (at most) 2k. The fast median filter system 102 then generates a pairwise selection network of size [n/k], omitting the initial pairwise swaps. Each swap (i,j) in this pairwise network becomes a merge operation between two sequences of size k at locations ik and jk. To handle the case where n is not a multiple of k, the fast median filter system 102 implicitly pads the sequence with +∞ and trims any of the operations that would touch these infinities down to smaller operations.

In some implementations, the fast median filter system 102 decomposes a Merge operation of size n, m to meet a size limit k. For instance, the fast median filter system 102 implicitly pads the first sequence at the beginning with −∞ to make its size a multiple of k and similarly pads the second sequence with +∞ at the end. The fast median filter system 102 then divides the sequences into leaves of size k and generates an odd-even merge network for two sequences of size [n/k] and [m/k] to act as a template. Additionally, the fast median filter system 102 inflates the template in the same way as for the Sort operation.

By decomposing Sort and Merge operations in this way, the fast median filter system 102 identifies places to skip work where part of a sequences has already been sorted by an earlier step. For instance, as the fast median filter system 102 generates the size-limited instruction sequence, the fast median filter system 102 tracks which sequences are known to be sorted and avoids emitting instructions that sort any already sorted sequence.

As mentioned, in one or more implementations, the fast median filter system 102 lowers or reduces a size-limited instruction stream to a bytecode by enumerating all instructions up to the size limit to make an instruction table. As part of this process, the fast median filter system 102 also maps each instruction to the entry in the table most capable of executing it. In some cases, the fast median filter system 102 implements a bytecode represented by the following pseudo-code: for (auto op:network) {switch (op.code) {case Sort_3: //3 loads, 3 swaps, 3 stores x=data[op.first]; y=data[op.first+1]; z=data[op.first+2]; sort2(x, y); sort2(x, z); sort2(x, y); data[op.first]=x; data[op.first+1]=y; data[op.first+2]=z; break; . . . case Sort_8: //8 loads, 19 swaps, 8 stores . . . case Merge_4_3://7 loads, 8 swaps, 7 stores . . . case Merge_4_4: //8 loads, 9 swaps, 8 stores . . . }}.

Figure 9:
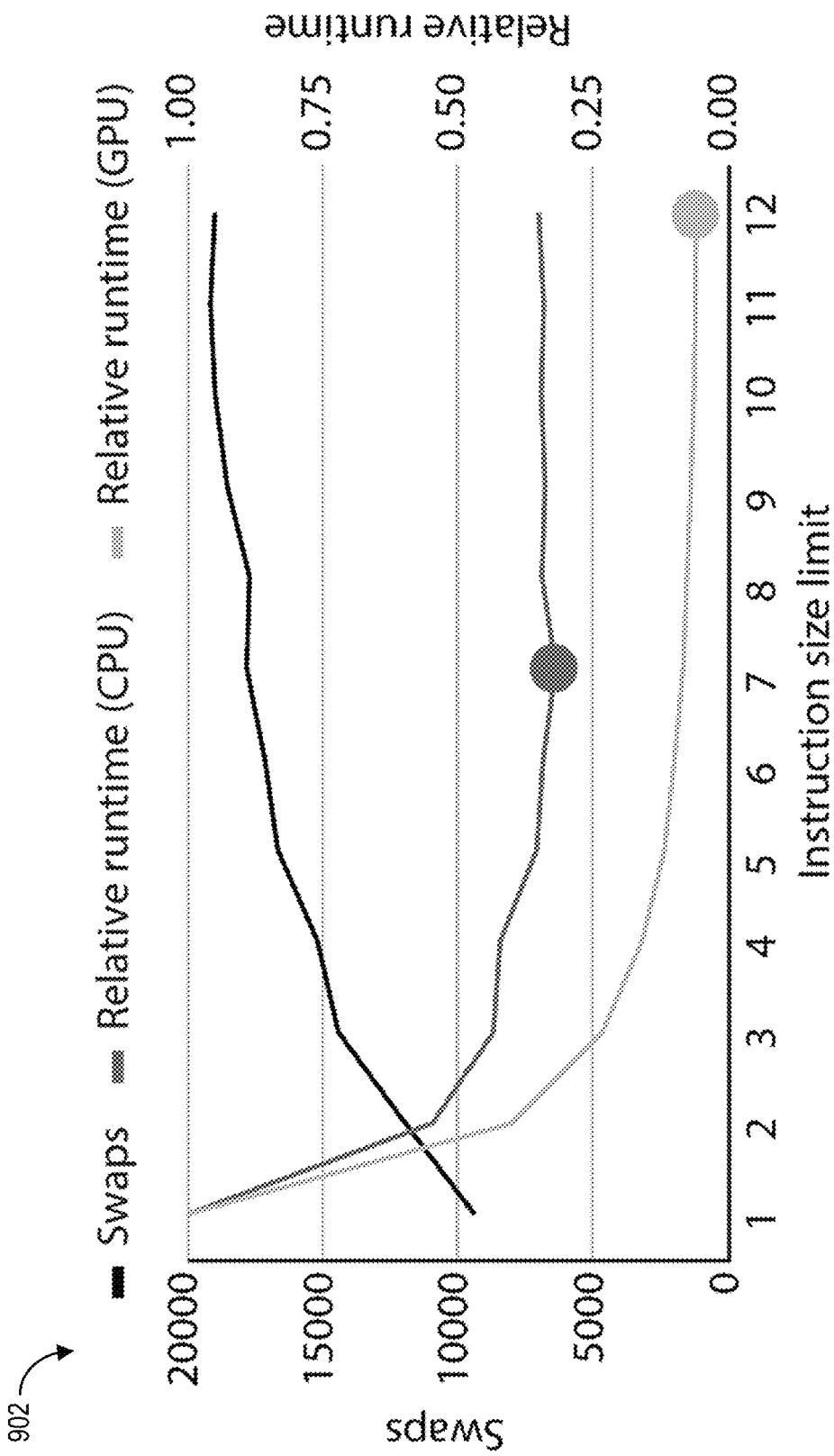
FIG. 9 illustrates a table of performance metrics associated with the fast median filter system in accordance with one or more implementations.

As mentioned, in certain described implementations, the fast median filter system 102 limits the instruction size (e.g., a number of swap operations and/or memory operations) for implementing a median filter. In particular, the fast median filter system 102 selects and utilizes an instruction size limit to improve performance in accordance with the description above. FIG. 9 illustrates an example table 902 depicting performance of an interpreted 101×101 median filter using 8×8 output tiles in accordance with one or more implementations.

To determine the benchmarks of FIG. 9 (and FIGS. 10A-10B), researchers used an INTEL i9-9960X processor locked to 3.1 GHz with hyperthreading disabled (e.g., the CPU) and an NVIDIA GeForce RTX 2060 (e.g., the GPU) to apply a median filter to a 2560×1600 digital image filled with uniform random noise (e.g., running UBUNTU 20.04).

As illustrated in FIG. 9, the table 902 indicates relative runtime for the CPU and GPU and corresponding changes in the number of swaps for the 101×101 filter using 8×8 tiles. As the maximum instruction size of the interpreter grows, runtime decreases even as swaps increase, because the larger instructions accomplish more useful work per value loaded and stored. In some implementations, the fast median filter system 102 utilizes instruction size limits indicated by the circles for the CPU and GPU, respectively. On CPU (using AVX2), the minimum runtime occurs just before values start spilling to the stack. On GPU, the minimum occurs above the range tested. In the table 902, runtimes are normalized to the worst-case performance which occurs when the interpreter performs one swap at a time.

Figure 10A:
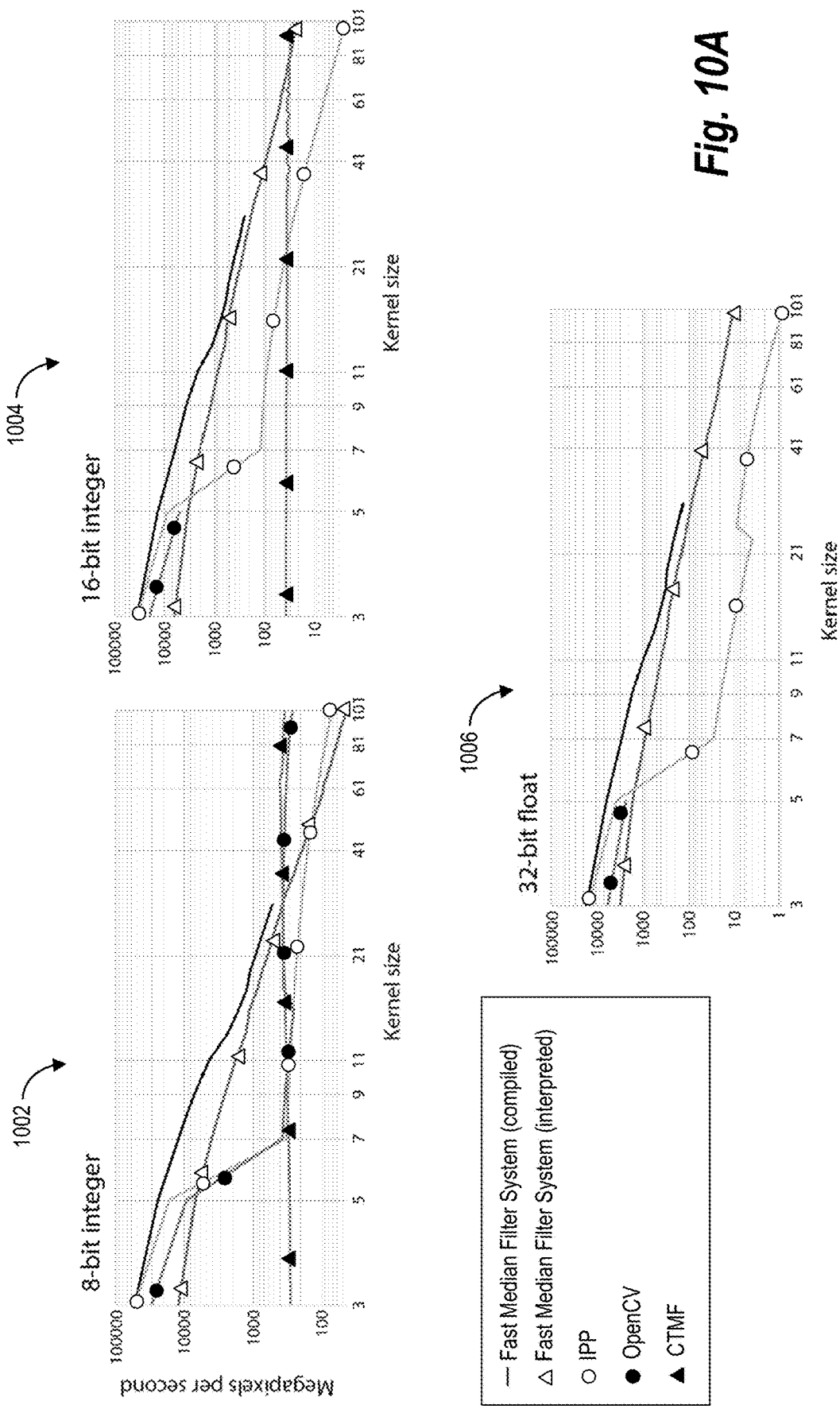
FIGS. 10A-10B illustrate tables of performance metrics comparing the fast median filter system against conventional systems in accordance with one or more implementations'

As mentioned, researchers have demonstrated performance improvements of the fast median filter system 102 over conventional systems. For example, FIG. 10A illustrates performance improvements when executed by a CPU (e.g., INTEL i9-9960X processor locked to 3.1 GHz with hyperthreading disabled) in accordance with one or more implementations. Thereafter, FIG. 10B illustrates performance improvements when executed by a GPU (e.g., NVIDIA GeForce RTX 2060) in accordance with one or more implementations.

As illustrated in FIG. 10A, the tables 1002-1006 depict CPU performance of two variations of the fast median filter system 102 (e.g., compiled and interpreted) as well as three conventional systems: i) Intel Performance Primitives ("IPP") that operates by using sorting networks for 3×3 and 5×5 median filters and switches between histogram or sorting methods depending on the data type, ii) Constant-Time Median Filter ("CTMF"), and iii) OpenCV as described by G. Bradski in *The OpenCV Library*, Dr. Dobb's Journal of Software Tools (2000). As shown, the table 1002 depicts results for an 8-bit integer, while the table 1004 depicts results for a 16-bit integer, and the table 1006 depicts results for a 32-bit float.

As shown in the table 1002, both variations the fast median filter system 102 outperform the conventional systems in processed megapixels per second at kernel sizes of at least 7 to 29. In the table 1004, the fast median filter system 102 outperforms conventional systems for sizes up to 77. Similarly, in the table 1006, the compiled fast median filter system 102 is fastest across all filter sizes (by more than an order of magnitude for sizes 7-37), and the interpreted fast median filter system 102 is faster than conventional systems for most sizes as well.

Figure 10B:
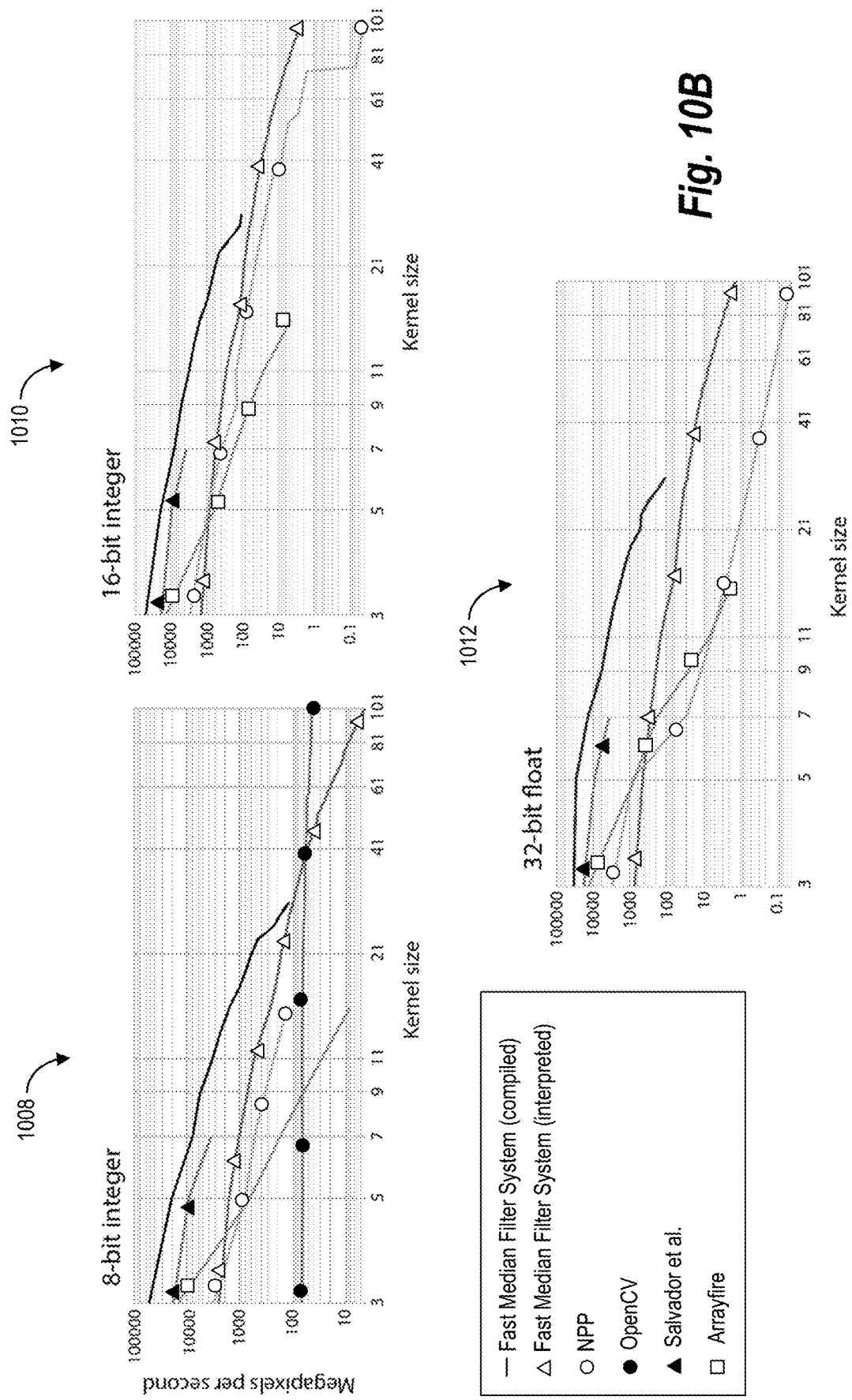

As illustrated in FIG. 10B, the tables 1008-1012 depict GPU performance of two variations of the fast median filter system 102 (e.g., compiled and interpreted) as well as four conventional systems: i) NVIDIA Performance Primitives ("NPP"), ii) OpenCV, iii) ArrayFire as described by Pavan Yalamanchili, Umar Arshad, Zakiuddin Mohammed, Pradeep Garigipati, Peter Entschev, Brian Kloppenborg, James Malcolm, and John Melonakos in *ArrayFire—A High Performance Software Library for Parallel Computing with an Easy-to-Use API* (2015), and iv) Salvador as described by Gabriel Salvador, Juan M. Chau, Jorge Quesada, and Cesar Carranza in *Efficient GPU-Based Implementations of the Median Filter based on a Multi-Pixel-Per-Thread Framework*, 2018 IEEE Southwest Symposium on Image Analysis and Interpretation, 121-24 (2018). As shown, the table 1002 depicts results for an 8-bit integer, while the table 1004 depicts results for a 16-bit integer, and the table 1006 depicts results for a 32-bit float.

As shown in the table 1008, the compiled fast median filter system 102 is fastest for sizes up to 39 at 8 bits, while the interpreted fast median filter system 102 is faster than the conventional systems for sizes of 5 to 39. In the table 1010, the compiled fast median filter system 102 is faster at all kernel sizes, while the interpreted fast median filter system 102 is faster than conventional systems for sizes larger than 7×7. Similarly, in the table 1012, the compiled fast median filter system 102 is at least 50× faster than the conventional systems at sizes above 7×7. The interpreted fast median filter system 102 also faster than the conventional systems by many times at these sizes.

Figure 11:
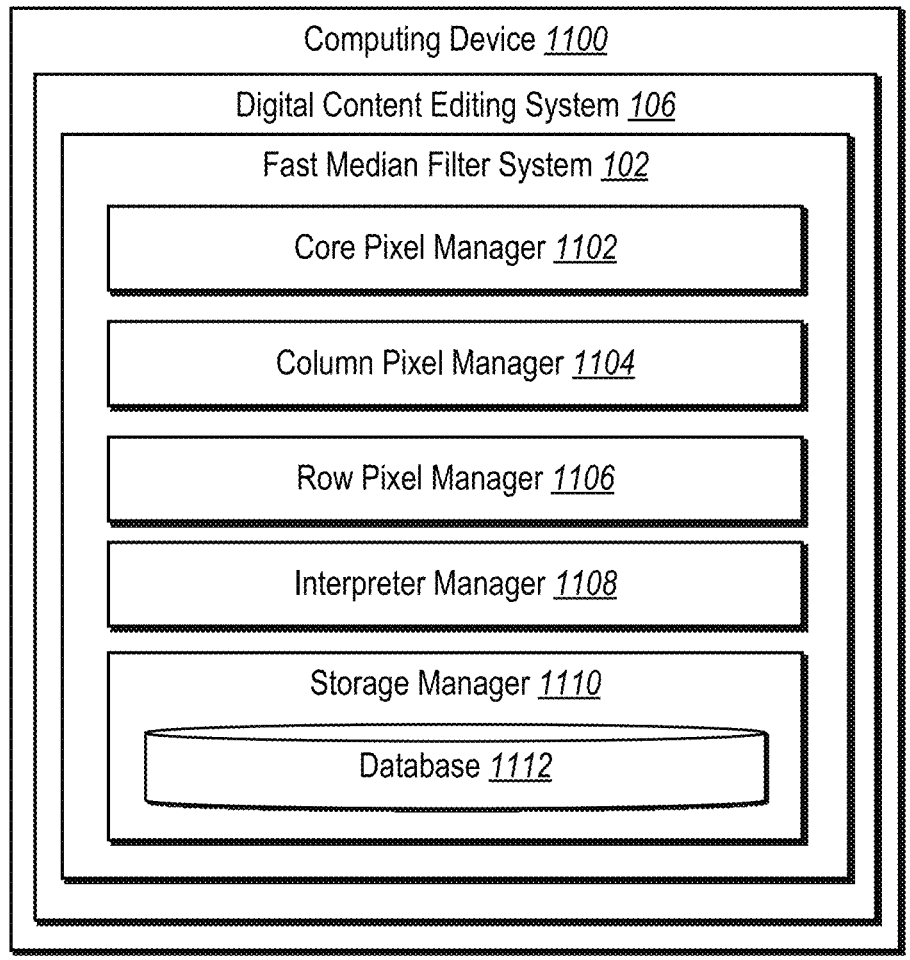
FIG. 11 illustrates a schematic diagram of a fast median filter system in accordance with one or more implementations.

Looking now to FIG. 11, additional detail will be provided regarding components and capabilities of the fast median filter system 102. Specifically, FIG. 11 illustrates an example schematic diagram of the fast median filter system 102 on an example computing device 1100 (e.g., one or more of the client device 108 and/or the server(s) 104). In some implementations, the computing device 1100 refers to a distributed computing system where different managers are located on different devices, as described above. As shown in FIG. 11, the fast median filter system 102 includes a core pixel manager 1102, a column pixel manager 1104, a row pixel manager 1106, an interpreter manager 1108, and a storage manager 1110.

As just mentioned, the fast median filter system 102 includes a core pixel manager 1102. In particular, the core pixel manager 1102 manages, maintains, determines, identifies, sorts, selects, or generates a core subset of pixels from an input tile of pixels captured from a digital image. For example, the core pixel manager 1102 identifies core pixels within an intersection of each footprint of an output tile—i.e., that map to (or could possibly include a median value for) each of the output pixels of an output tile. In addition, the core pixel manager 1102 sorts the core pixels as described herein. In some cases, the core pixel manager 1102 identifies a middle subset or a middle number of pixels to preserve from the core pixels for subsequent filtering steps.

As shown, the fast median filter system 102 also includes a column pixel manager 1104. In particular, the column pixel manager 1104 manages, identifies, sorts, determines, merges, combines, or groups columns of pixels from an input tile. For example, the column pixel manager 1104 identifies extra columns of pixels not included as part of the core subset. In some cases, the column pixel manager 1104 also merges the extra columns into groups as described above. The column pixel manager 1104 further merges the groups of extra columns with the core subset to generate column-modified subsets of pixels. Additionally, the column pixel manager 1104 selects a middle number of pixels from the column-modified subsets to preserve as possibly containing median pixel values.

As further illustrated in FIG. 11, the fast median filter system 102 includes a row pixel manager 1106. In particular, the row pixel manager 1106 manages, identifies, sorts, determines, merges, combines, or groups rows of pixels from an input tile. For example, the row pixel manager 1106 identifies rows of pixels that are separate from the core subset, sorts the rows of pixels, and combines the rows of pixels into groups as described above. In some cases, the row pixel manager 1106 also determines median pixel values for an output tile. For instance, and as described above, the row pixel manager 1106 generates row-column-modified subsets of pixels by combining groups of extra rows with column-modified subsets (or preserved middle pixels from the column-modified subsets). From the row-column-modified subsets, the row pixel manager 1106 further selects a middle subset of pixels, identifies and sorts corner pixels, combines corner pixels with the selected middle subsets, and determines median pixel values for an output tile.

Additionally, the fast median filter system 102 includes an interpreter manager 1108. In particular, the interpreter manager 1108 manages, maintains, applies, implements, or utilizes an interpreter to generate and/or apply a median filter to a digital image. For example, the interpreter manager 1108 executes a bytecode as described above to generate a median filter of a particular filter size and to apply the median filter to a digital image. In some cases, the interpreter manager 1108 generates a modified median filter by inflating a template median filter according to a user-selected filter size. The interpreter manager 1108 further generates a modified digital image by utilizing the modified median filter to filter a digital image.

The fast median filter system 102 further includes a storage manager 1110. The storage manager 1110 operates in conjunction with, or includes, one or more memory devices such as the database 1112 (e.g., the database 112) that store various data such as digital images, median filters, and pixel values.

In one or more implementations, each of the components of the fast median filter system 102 are in communication with one another using any suitable communication technologies. Additionally, the components of the fast median filter system 102 is in communication with one or more other devices including one or more client devices described above. It will be recognized that although the components of the fast median filter system 102 are shown to be separate in FIG. 11, any of the subcomponents may be combined into fewer components, such as into a single component, or divided into more components as may serve a particular implementation. Furthermore, although the components of FIG. 11 are described in connection with the fast median filter system 102, at least some of the components for performing operations in conjunction with the fast median filter system 102 described herein may be implemented on other devices within the environment.

The components of the fast median filter system 102 can include software, hardware, or both. For example, the components of the fast median filter system 102 can include one or more instructions stored on a computer-readable storage medium and executable by processors of one or more computing devices (e.g., the computing device 1100). When executed by the one or more processors, the computer-executable instructions of the fast median filter system 102 can cause the computing device 1100 to perform the methods described herein. Alternatively, the components of the fast median filter system 102 can comprise hardware, such as a special purpose processing device to perform a certain function or group of functions. Additionally, or alternatively, the components of the fast median filter system 102 can include a combination of computer-executable instructions and hardware.

Furthermore, the components of the fast median filter system 102 performing the functions described herein may, for example, be implemented as part of a stand-alone application, as a module of an application, as a plug-in for applications including content management applications, as a library function or functions that may be called by other applications, and/or as a cloud-computing model. Thus, the components of the fast median filter system 102 may be implemented as part of a stand-alone application on a personal computing device or a mobile device. Alternatively, or additionally, the components of the fast median filter system 102 may be implemented in any application that allows creation and delivery of marketing content to users, including, but not limited to, applications in ADOBE® CREATIVE CLOUD®, such as ADOBE® PHOTOSHOP®, LIGHTROOM®, and INDESIGN®. "ADOBE," "CREATIVE CLOUD," "PHOTOSHOP," "LIGHTROOM," and "INDESIGN" are either registered trademarks or trademarks of Adobe Inc. in the United States and/or other countries.

FIGS. 1-11 the corresponding text, and the examples provide a number of different systems, methods, and non-transitory computer readable media for generating and utilizing fast median filters with a computation-sharing approach. In addition to the foregoing, implementations can also be described in terms of flowcharts comprising acts for accomplishing a particular result. For example, FIGS. 12-13 illustrate flowcharts of example sequences or series of acts in accordance with one or more implementations.

Figure 12:
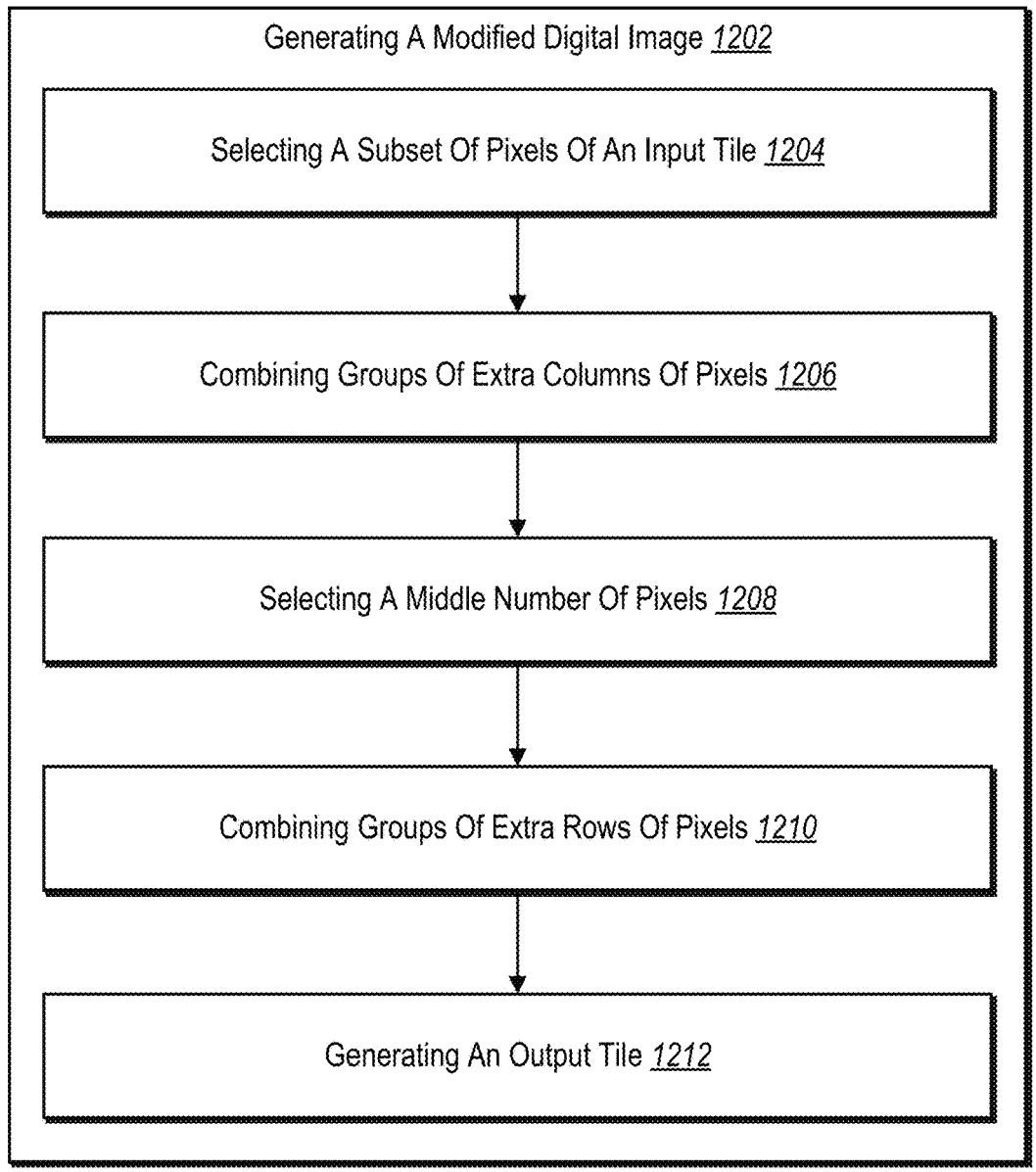
FIG. 12 illustrates a flowchart of a series of acts for generating a modified digital image utilizing a computation sharing approach for a median filter in accordance with one or more implementations.
Figure 13:
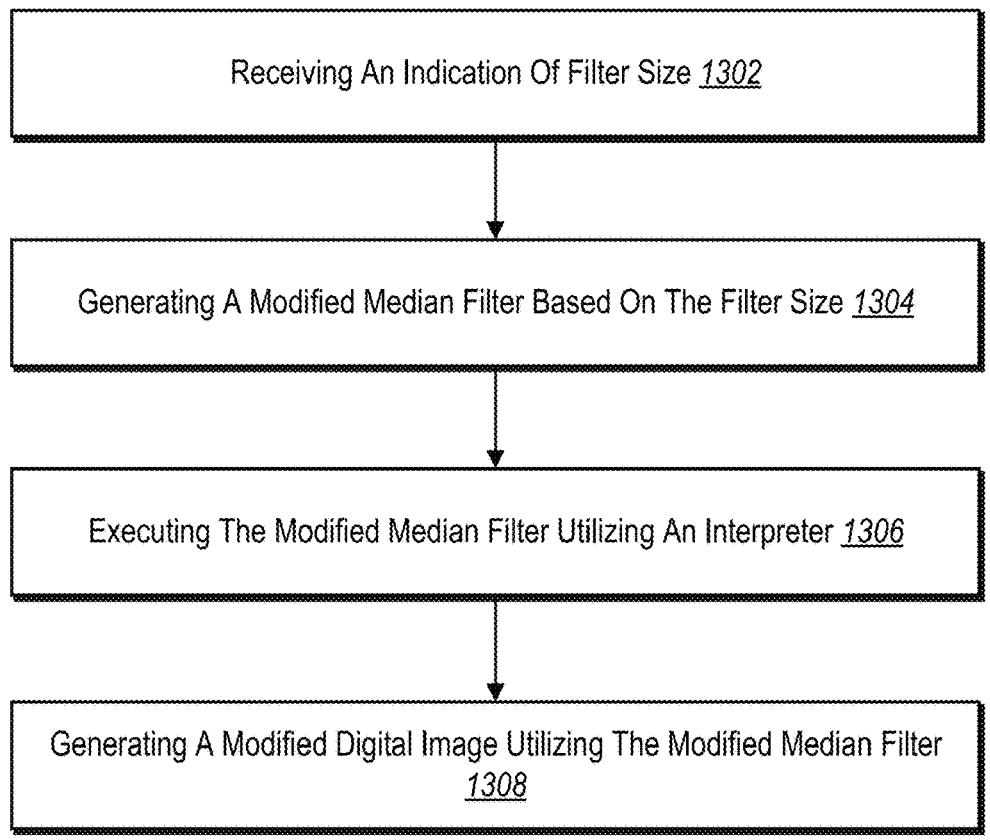
FIG. 13 illustrates a flowchart of a series of acts for utilizing an interpreter approach to generate an execute a median filter of an arbitrary size in accordance with one or more implementations.

While FIGS. 12-13 illustrate acts according to particular implementations, alternative implementations may omit, add to, reorder, and/or modify any of the acts shown in FIGS. 12-13. The acts of FIGS. 12-13 can be performed as part of a method. Alternatively, a non-transitory computer readable medium can comprise instructions, that when executed by one or more processors, cause a computing device to perform the acts of FIGS. 12-13. In still further implementations, a system can perform the acts of FIGS. 12-13. Additionally, the acts described herein may be repeated or performed in parallel with one another or in parallel with different instances of the same or other similar acts.

FIG. 12 illustrates an example series of acts 1200 for generating and utilizing fast median filters with a computation-sharing approach. In particular, the series of acts 1200 includes an act 1202 of generating a modified digital image. For example, the act 1202 involves generate a modified digital image by filtering a digital image. In some implementations, filtering a digital image includes additional acts, such as the acts 1204-1212.

For example, the act 1204 includes selecting a subset of pixels of an input tile. In some cases, the act 1204 involves selecting a subset of pixels of an input tile captured from the digital image. In certain implementations, the act 1204 involves determining core pixels of the input tile that map to pixels of the output tile and determining core pixels of the input tile that map to pixels of the output tile. In these or other implementations, the act 1204 involves determining core pixels of the input tile that at each map to every pixel of the output tile, sorting the core pixels into a sorted list utilizing a sorting network, and selecting a middle group of pixels from the sorted list according to a number of pixels of the input tile that are outside of the subset of pixels. In some implementations, the act 1204 involves utilizing the median filter having a filter size of at least eleven pixels by eleven pixels.

In addition, the act 1206 includes combining groups of extra columns of pixels. In some cases, the act 1206 involves combining groups of extra columns of pixels from the input tile for merging with the subset of pixels to generate a plurality of column-modified subsets of pixels that each include the subset of pixels and a respective group of extra columns of pixels. In some implementations, the act 1206 involves selecting columns of pixels from the input tile that are separate from the subset of pixels and merging the columns of pixels together into groups utilizing a merge network. In these or other implementations, the act 1206 involves merging a group of extra columns of pixels with the subset of pixels utilizing a merge network. In one or more implementations, the act 1206 involves merging the groups of extra columns of pixels with the subset of pixels such that each of the column-modified subsets of pixels include the subset of pixels and a respective group of extra columns of pixels, wherein the extra columns of pixels comprise columns of pixels from the input tile that are separate from the subset of pixels. In some cases, the act 1206 involves selecting a number of columns of pixels from the input tile that are separate from the subset of pixels and merging, from among the number of columns of pixels, adjacent columns of pixels into groups.

Further, the act 1208 includes selecting a middle number of pixels. In some cases, the at 1208 involves selecting a middle number of pixels from each of the column-modified subsets of pixels. In one or more implementations, the act 1208 involves selecting sorted pixels from an intersection of footprints corresponding to output pixels of the output tile. In these or other implementations, the act 1208 involves selecting a number of pixels within each of the column-modified subsets of pixels that is one more than a number of pixels of the input tile that are not yet analyzed.

As shown, the act 1210 includes combining groups of extra rows of pixels. In some cases, the act 1210 involves combining groups of extra rows of pixels from the input tile for merging with each middle number of pixels to generate a plurality of row-column-modified subsets of pixels. In one or more implementations, the act 1210 involves selecting rows of pixels from the input tile that are separate from the subset of pixels, sorting the rows of pixels utilizing a sort network, and merging the rows of pixels together into groups utilizing a merge network. IN some cases, the act 1210 involves selecting a number of rows of pixels from the input tile that are separate from the subset of pixels and merging, from among the number of rows of pixels, adjacent rows of pixels together into groups.

As further shown, the act 1212 includes generating an output tile. In some cases, the act 1212 involves generating an output tile from the row-column-modified subsets of pixels. In one or more implementations, the act 1212 involves, for each pixel of the output tile, selecting a middle subset of pixels from a corresponding row-column-modified subset of pixels, merging extra corner pixels from the input tile with the middle subset of pixels to generate a corner-modified subset of pixels, and determining a median pixel value from the corner-modified subset of pixels.

In some implementations, generating an output tile as part of a modified digital image includes combining groups of extra rows of pixels from the input tile for merging with each middle number of pixels to generate a plurality of row-column-modified subsets of pixels. In these or other implementations, generating an output tile includes, for each pixel of the output tile: selecting a middle subset of pixels from a corresponding row-column-modified subset of pixels, merging extra corner pixels from the input tile with the middle subset of pixels to generate a corner-modified subset of pixels, and determining a median pixel value from the corner-modified subset of pixels. In some cases, generating an output tile includes selecting extra corner pixels by determining corner pixels from the input tile that are separate from the subset of pixels, separate from the groups of extra columns of pixels, and separate from the groups of extra rows of pixels. For example, selecting an extra corner pixel involves determining a corner pixel from the input tile that maps uniquely to a single pixel of the output tile.

FIG. 13 illustrates an example series of acts 1300 for utilizing an interpreter approach to generate and apply a median filter to a digital image. In particular, the series of acts 1300 includes an act 1302 of receiving an indication of filter size. For example, the act 1302 involves receiving an indication of user interaction selecting a filter size for a median filter to filter a digital image.

In addition, the series of acts 1300 includes an act 1304 of generating a modified median filter based on the filter size. For example, the act 1304 involves generating a modified median filter at runtime by inflating a template median filter by a factor corresponding to the filter size indicated by the user interaction. In some cases, the act 1304 involves combining pixel values of an input tile captured by the modified median filter into sorted groups of pixel values according to the filter size indicated by the user interaction and replacing values of the template median filter with the sorted groups of pixel values.

Further, the series of acts 1300 includes an act 1306 of executing the modified median filter utilizing an interpreter. For example, the act 1306 involves executing the modified median filter utilizing a sorting network interpreter to perform a limited number of memory operations in applying the modified median filter to the digital image. In some cases, the act 1306 involves loading a limited number of pixel values into memory registers, performing a number of swap operations on the pixel values loaded into the memory registers, and storing the pixel values after the swap operations.

As shown, the series of acts 1300 includes an act 1308 of generating a modified digital image utilizing the modified median filter. For example, the act 1308 involves generating a modified digital image from the digital image utilizing the modified median filter. In some cases, the act 1308 involves applying the modified median filter to determine median pixel values for replacing groups of pixel values of the digital image captured by a window of the modified median filter corresponding to the filter size.

Implementations of the present disclosure may comprise or utilize a special purpose or general-purpose computer including computer hardware, such as, for example, one or more processors and system memory, as discussed in greater detail below. Implementations within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, implementations of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some implementations, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Implementations of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
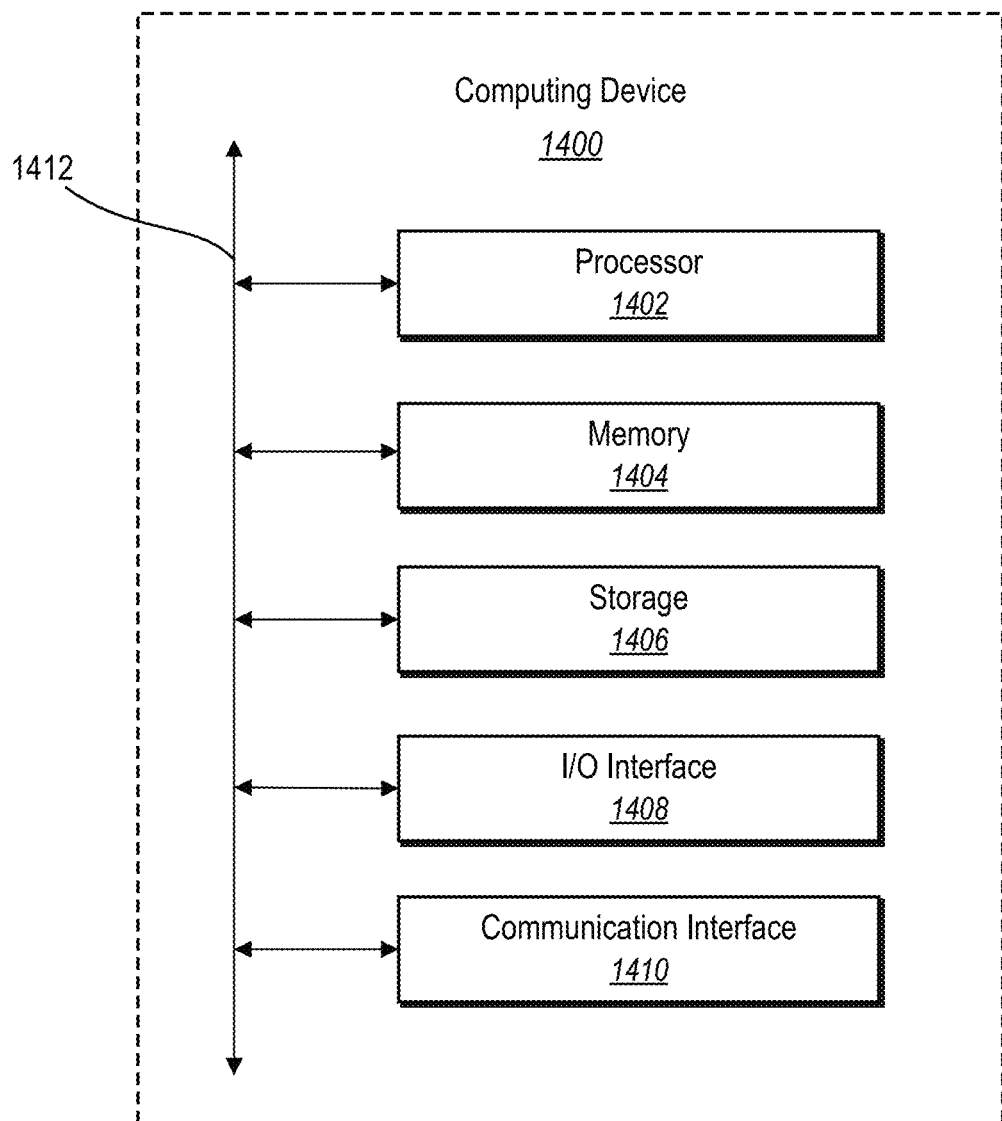
FIG. 14 illustrates a block diagram of an example computing device in accordance with one or more implementations.

FIG. 14 illustrates, in block diagram form, an example computing device 1400 (e.g., the computing device 1100, the client device 108, and/or the server(s) 104) that may be configured to perform one or more of the processes described above. One will appreciate that the fast median filter system 102 can comprise implementations of the computing device 1400. As shown by FIG. 14, the computing device can comprise a processor 1402, memory 1404, a storage device 1406, an I/O interface 1408, and a communication interface 1410. Furthermore, the computing device 1400 can include an input device such as a touchscreen, mouse, keyboard, etc. In certain implementations, the computing device 1400 can include fewer or more components than those shown in FIG. 14. Components of computing device 1400 shown in FIG. 14 will now be described in additional detail.

In particular implementations, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1406 and decode and execute them.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random-Access Memory ("RAM"), Read Only Memory ("ROM"), a solid-state disk ("SSD"), Flash, Phase Change Memory ("PCM"), or other types of data storage. The memory 1404 may be internal or distributed memory.

The computing device 1400 includes a storage device 1406 includes storage for storing data or instructions. As an example, and not by way of limitation, storage device 1406 can comprise a non-transitory storage medium described above. The storage device 1406 may include a hard disk drive (HDD), flash memory, a Universal Serial Bus (USB) drive or a combination of these or other storage devices.

The computing device 1400 also includes one or more input or output ("I/O") devices/interfaces 1408, which are provided to allow a user to provide input to (such as user strokes), receive output from, and otherwise transfer data to and from the computing device 1400. These I/O devices/interfaces 1408 may include a mouse, keypad or a keyboard, a touch screen, camera, optical scanner, network interface, modem, other known I/O devices or a combination of such I/O devices/interfaces 1408. The touch screen may be activated with a writing device or a finger.

The I/O devices/interfaces 1408 may include one or more devices for presenting output to a user, including, but not limited to, a graphics engine, a display (e.g., a display screen), one or more output drivers (e.g., display drivers), one or more audio speakers, and one or more audio drivers. In certain implementations, devices/interfaces 1408 is configured to provide graphical data to a display for presentation to a user. The graphical data may be representative of one or more graphical user interfaces and/or any other graphical content as may serve a particular implementation.

The computing device 1400 can further include a communication interface 1410. The communication interface 1410 can include hardware, software, or both. The communication interface 1410 can provide one or more interfaces for communication (such as, for example, packet-based communication) between the computing device and one or more other computing devices 1400 or one or more networks. As an example, and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

In the foregoing specification, the invention has been described with reference to specific example implementations thereof. Various implementations and aspects of the invention(s) are described with reference to details discussed herein, and the accompanying drawings illustrate the various implementations. The description above and drawings are illustrative of the invention and are not to be construed as limiting the invention. Numerous specific details are described to provide a thorough understanding of various implementations of the present invention.

The present invention may be embodied in other specific forms without departing from its spirit or essential characteristics. The described implementations are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

What is claimed is:

1. A non-transitory computer readable medium comprising instructions that, when executed by at least one processor, cause a computing device to:
generate a modified digital image by filtering a digital image, wherein filtering the digital image comprises:
selecting a subset of pixels of an input tile captured from the digital image;
combining groups of extra columns of pixels from the input tile for merging with the subset of pixels to generate a plurality of column-modified subsets of pixels that each include the subset of pixels and a respective group of extra columns of pixels;
selecting a middle number of pixels from each of the column-modified subsets of pixels;
combining groups of extra rows of pixels from the input tile for merging with each middle number of pixels to generate a plurality of row-column-modified subsets of pixels; and
generating an output tile from the row-column-modified subsets of pixels by sorting the row-column-modified subsets of pixels utilizing a diagonal sorting network that discards hyperbolic slices of pixel values from the row-column-modified subsets of pixels.

2. The non-transitory computer readable medium of claim 1, further comprising instructions that, when executed by the at least one processor, cause the computing device to select the subset of pixels by:
determining core pixels of the input tile that map to pixels of the output tile; and
sorting the core pixels utilizing a sorting network.

3. The non-transitory computer readable medium of claim 1, further comprising instructions that, when executed by the at least one processor, cause the computing device to combine the groups of extra columns by:
selecting columns of pixels from the input tile that are separate from the subset of pixels; and
merging the columns of pixels together into groups utilizing a merge network.

4. The non-transitory computer readable medium of claim 1, further comprising instructions that, when executed by the at least one processor, cause the computing device to generate the plurality of column-modified subsets of pixels by merging a group of extra columns of pixels with the subset of pixels utilizing a merge network.

5. The non-transitory computer readable medium of claim 1, further comprising instructions that, when executed by the at least one processor, cause the computing device to select the middle number of pixels from each of the column-modified subsets of pixels by selecting sorted pixels from an intersection of footprints corresponding to output pixels of the output tile.

6. The non-transitory computer readable medium of claim 1, further comprising instructions that, when executed by the at least one processor, cause the computing device to combine the groups of extra rows of pixels by:
selecting rows of pixels from the input tile that are separate from the subset of pixels;
sorting the rows of pixels utilizing a sort network; and
merging the rows of pixels together into groups utilizing a merge network.

7. The non-transitory computer readable medium of claim 1, further comprising instructions that, when executed by the at least one processor, cause the computing device to generate the output tile from the row-column-modified subsets of pixels by, for each pixel of the output tile:
  selecting a middle subset of pixels from a corresponding row-column-modified subset of pixels;
  merging extra corner pixels from the input tile with the middle subset of pixels to generate a corner-modified subset of pixels; and
  determining a median pixel value from the corner-modified subset of pixels.

8. The non-transitory computer readable medium of claim 1, further comprising instructions that, when executed by the at least one processor, cause the computing device to select the subset of pixels utilizing a median filter having a filter size of at least eleven pixels by eleven pixels.

9. A system comprising:
  one or more memory devices comprising a digital image and a median filter;
  one or more computing devices that are configured to cause the system to:
    generate a modified digital image by filtering the digital image utilizing the median filter, wherein filtering the digital image comprises:
      selecting a subset of pixels of an input tile captured from the digital image by the median filter;
      combining groups of extra columns of pixels from the input tile for merging with the subset of pixels to generate a plurality of column-modified subsets of pixels;
      selecting a middle number of pixels from each of the column-modified subsets of pixels;
      combining groups of extra rows of pixels from the input tile for merging with each middle number of pixels to generate a plurality of row-column-modified subsets of pixels; and
      generating an output tile from the row-column-modified subsets of pixels by sorting the row-column-modified subsets of pixels utilizing a diagonal sorting network that discards hyperbolic slices of pixel values from the row-column-modified subsets of pixels.

10. The system of claim 9, wherein the one or more computing devices are further configured to cause the system to select the subset of pixels by:
  determining core pixels of the input tile that at each map to every pixel of the output tile;
  sorting the core pixels into a sorted list utilizing a sorting network; and
  selecting a middle group of pixels from the sorted list according to a number of pixels of the input tile that are outside of the subset of pixels.

11. The system of claim 9, wherein the one or more computing devices are further configured to cause the system to generate the plurality of column-modified subsets of pixels by merging the groups of extra columns of pixels with the subset of pixels such that each of the column-modified subsets of pixels include the subset of pixels and a respective group of extra columns of pixels, wherein the extra columns of pixels comprise columns of pixels from the input tile that are separate from the subset of pixels.

12. The system of claim 9, wherein the one or more computing devices are further configured to cause the system to generate the output tile from the row-column-modified subsets of pixels by iteratively, for each pixel of the output tile:
  selecting a middle subset of pixels from a corresponding row-column-modified subset of pixels;
  merging extra corner pixels from the input tile with the middle subset of pixels to generate a corner-modified subset of pixels; and
  determining a median pixel value from the corner-modified subset of pixels.

13. The system of claim 12, wherein the one or more computing devices are further configured to cause the system to select the extra corner pixels for merging with the input tile by determining corner pixels from the input tile that are separate from the subset of pixels, separate from the groups of extra columns of pixels, and separate from the groups of extra rows of pixels.

14. The system of claim 12, wherein the one or more computing devices are further configured to cause the system to select an extra corner pixel for merging with the middle subset of pixels by determining a corner pixel from the input tile that maps uniquely to a single pixel of the output tile.

15. The system of claim 9, wherein the one or more computing devices are further configured to cause the system to:
  combine the groups of extra columns of pixels by:
    selecting a number of columns of pixels from the input tile that are separate from the subset of pixels; and
    merging, from among the number of columns of pixels, adjacent columns of pixels into groups; and
  combine the groups of extra rows of pixels by:
    selecting a number of rows of pixels from the input tile that are separate from the subset of pixels; and
    merging, from among the number of rows of pixels, adjacent rows of pixels together into groups.

16. The system of claim 9, wherein the one or more computing devices are further configured to cause the system to select the middle number of pixels from each of the column-modified subsets of pixels by selecting a number of pixels within each of the column-modified subsets of pixels that is one more than a number of pixels of the input tile that are not yet analyzed.

17. A computer-implemented method for applying variable-size median filters on digital images utilizing an interpreter approach, the computer-implemented method comprising:
  receiving an indication of user interaction selecting a filter size for a median filter to filter a digital image;
  generating, according to the filter size indicated by the user interaction, a modified median filter at runtime by inflating a template median filter by an inflation factor determined based on a processor type used to apply the modified median filter;
  executing the modified median filter utilizing a sorting network interpreter to perform a limited number of memory operations in applying the modified median filter to the digital image; and
  generating a modified digital image from the digital image utilizing the modified median filter.

18. The computer-implemented method of claim 17, wherein inflating the template median filter comprises:
  combining pixel values of an input tile captured by the modified median filter into sorted groups of pixel values according to the filter size indicated by the user interaction; and
  replacing values of the template median filter with the sorted groups of pixel values.

19. The computer-implemented method of claim 17, wherein executing the modified median filter comprises:
  loading a limited number of pixel values into memory registers;

performing a number of swap operations on the pixel values loaded into the memory registers; and storing the pixel values after the swap operations.

20. The computer-implemented method of claim 17, wherein generating the modified digital image from the digital image comprises applying the modified median filter to determine median pixel values for replacing groups of pixel values of the digital image captured by a window of the modified median filter corresponding to the filter size.

* * * * *